(12) United States Patent
Fujiwara et al.

(10) Patent No.: US 10,755,505 B2
(45) Date of Patent: Aug. 25, 2020

(54) LOCKING AND UNLOCKING SYSTEM, KEY UNIT, AND SERVER

(71) Applicant: TOYOTA JIDOSHA KABUSHIKI KAISHA, Toyota-shi (JP)

(72) Inventors: Yasuhisa Fujiwara, Miyoshi (JP); Hiroko Tsujimura, Gifu (JP); Yuichiro Haruna, Oyama (JP); Satoru Maegawa, Nagoya (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 16/704,996

(22) Filed: Dec. 5, 2019

(65) Prior Publication Data

US 2020/0111275 A1 Apr. 9, 2020

Related U.S. Application Data

(63) Continuation of application No. 15/915,812, filed on Mar. 8, 2018, now Pat. No. 10,529,162.

(30) Foreign Application Priority Data

Mar. 9, 2017 (JP) .................................. 2017-045103

(51) Int. Cl.
*G07C 9/00* (2020.01)
*B60R 25/24* (2013.01)
(Continued)

(52) U.S. Cl.
CPC .......... *G07C 9/00571* (2013.01); *B60R 25/24* (2013.01); *G07C 9/00309* (2013.01);
(Continued)

(58) Field of Classification Search
None
See application file for complete search history.

(56) References Cited

U.S. PATENT DOCUMENTS 8,417,258 B2 4/2013 Barnes, Jr.
9,721,406 B2 8/2017 Isaacson
(Continued)

FOREIGN PATENT DOCUMENTS

CN 101833729 A 9/2010
JP 2006-118122 5/2006
(Continued)

*Primary Examiner* — K. Wong
(74) *Attorney, Agent, or Firm* — Oblon, McClelland, Maier & Neustadt, L.L.P.

(57) ABSTRACT

A locking and unlocking system includes: a server; a mobile terminal; and a key unit, wherein the server includes a server transmission unit configured to transmit cancel information, wherein the mobile terminal includes a terminal transmission unit configured to transmit first authentication information and a first request signal, wherein the key unit includes: a key-unit first reception unit configured to receive the cancel information; a key-unit second reception unit configured to receive the first authentication information and the first request signal; a first authentication unit configured to authenticate the mobile terminal; and a locking and unlocking processing unit configured to perform a process of unlocking or locking the door of the vehicle or facility, and wherein the locking and unlocking processing unit is configured to prohibit unlocking of the door of the vehicle or facility.

4 Claims, 10 Drawing Sheets

(51) Int. Cl.
*G07C 9/32* (2020.01)
*H04W 12/06* (2009.01)
*E05B 81/04* (2014.01)
*E05B 47/00* (2006.01)

(52) U.S. Cl.
CPC .............. *G07C 9/32* (2020.01); *H04W 12/06* (2013.01); *E05B 81/04* (2013.01); *E05B 2047/0095* (2013.01); *G07C 2009/00865* (2013.01); *G07C 2209/08* (2013.01)

(56) References Cited

U.S. PATENT DOCUMENTS

| | | |
|---|---|---|
| 2002/0186144 A1 | 12/2002 | Meunier |
| 2017/0372546 A1 | 12/2017 | Haruna |
| 2019/0197471 A1* | 6/2019 | Endo |

FOREIGN PATENT DOCUMENTS

| | | |
|---|---|---|
| JP | 2009-127284 A | 6/2009 |
| JP | 2016-12369 A | 1/2016 |
| JP | 2016-71834 A | 5/2016 |
| JP | 2017-40125 A | 2/2017 |

* cited by examiner

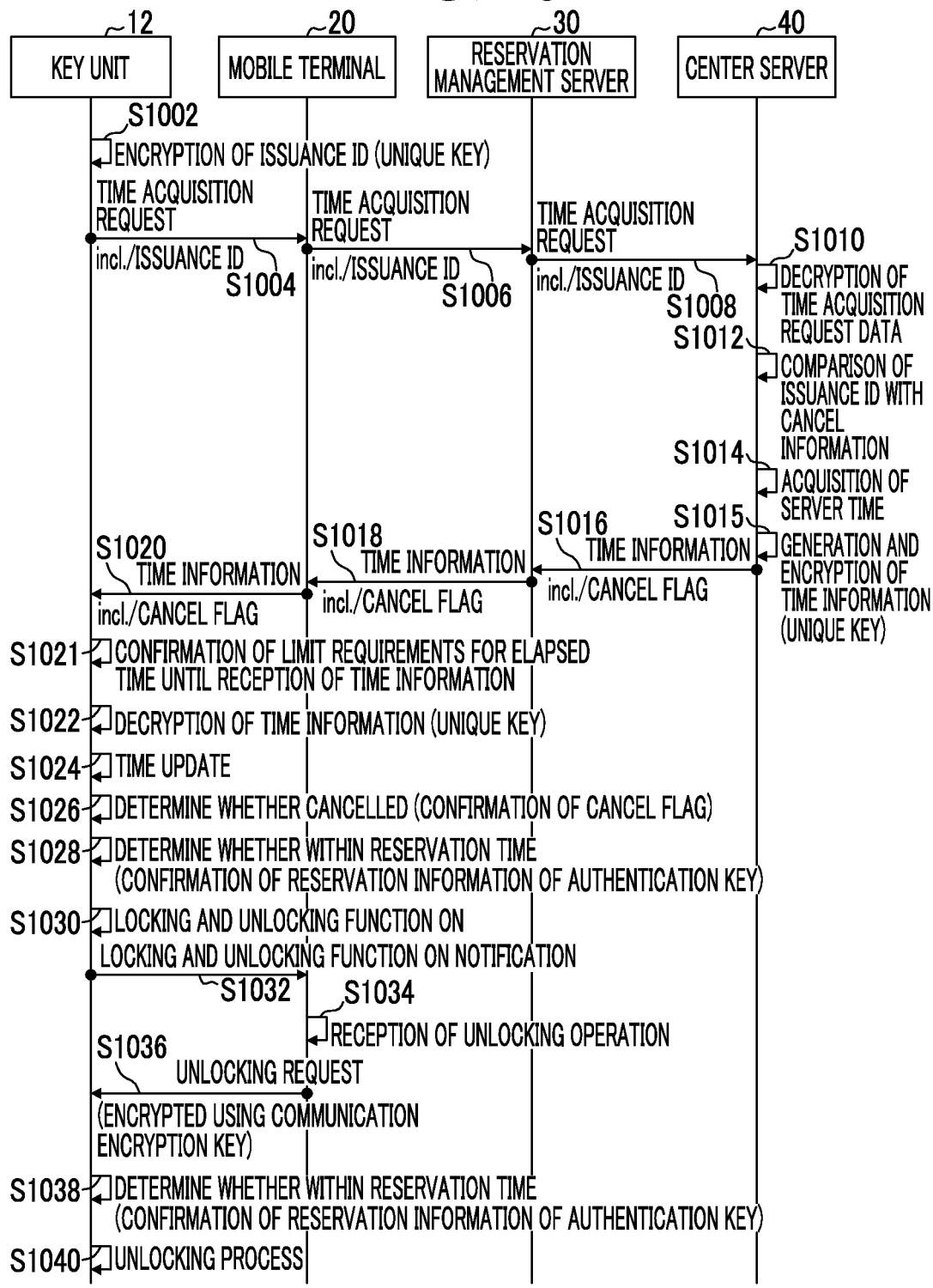

LOCKING AND UNLOCKING SYSTEM, KEY UNIT, AND SERVER

INCORPORATION BY REFERENCE

This application is a continuation of U.S. patent application Ser. No. 15/915,812 filed Mar. 8, 2018, which claims the benefit of priority from prior Japanese Patent Application No. 2017-045103 filed on Mar. 9, 2017, each of which is incorporated herein by reference in their entirety.

BACKGROUND

1. Technical Field

The disclosure relates to a locking and unlocking system, key unit and server.

2. Description of Related Art

A key management system in which key information for unlocking a vehicle, that is, authentication information for determining whether a vehicle side permits unlocking, is received from a server via a network by a mobile terminal and the mobile terminal can be used as an electronic key has been disclosed (for example, see Japanese Unexamined Patent Application Publication No. 2006-118122 (JP 2006-118122 A) or the like).

By employing this configuration, a problem of delivering an electronic key or the like can be solved and convenience to a user is improved, for example, when a plurality of users share and use a specific vehicle such as a rented car, a shared car, or a company car in different time zones.

The same technology can be used to lock and unlock the same facility (a facility such as a conference room, a resort house, or a gymnasium) which is used in different time periods by a plurality of users, and the convenience to users is improved by using a mobile terminal as an electronic key to a locking and unlocking device which is installed in the facility.

SUMMARY

It is conceivable that a configuration in which authentication information can be acquired from a server or a predetermined terminal in advance to unlock a vehicle or facility even in a situation in which the mobile terminal cannot access a communication network for accessing the server may be employed.

However, when authentication information is allowed to be acquired in advance, there is a likelihood that a malicious third party having gotten a mobile terminal storing authentication information acquired in advance will improperly use a vehicle or facility even if the mobile terminal is stolen or the mobile terminal is lost by a user and then a reservation for the vehicle or facility is cancelled.

Therefore, the disclosure provides a locking and unlocking system that can prevent a malicious third party having gotten a mobile terminal storing authentication information acquired in advance from improperly using a vehicle or facility even when authentication information can be acquired in advance.

According to a first aspect of the disclosure, there is provided a locking and unlocking system including: a server configured to store information on a reservation for a vehicle or facility; a mobile terminal configured to communicate with the server; and a key unit configured to unlock or lock a door of the vehicle or facility, the key unit being disposed in the vehicle or facility, wherein the server includes a server transmission unit configured to transmit cancel information indicating whether the reservation for the vehicle or facility has been cancelled to the key unit, the mobile terminal includes a terminal transmission unit configured to transmit first authentication information correlated with the reservation for the vehicle or facility and a first request signal for requesting unlocking or locking of the door of the vehicle or facility to the key unit, the key unit includes: a key-unit first reception unit configured to receive the cancel information from the server; a key-unit second reception unit configured to receive the first authentication information and the first request signal from the mobile terminal; a first authentication unit configured to authenticate the mobile terminal based on the first authentication information when the first authentication information has been received by the key-unit second reception unit; and a locking and unlocking processing unit configured to perform a process of unlocking or locking the door of the vehicle or facility when the authentication of the mobile terminal by the first authentication unit has succeeded and the first request signal has been received by the key-unit second reception unit, and the locking and unlocking processing unit is configured to prohibit unlocking of the door of the vehicle or facility based on the first request signal for requesting unlocking of the door, which is transmitted from the mobile terminal, when the authentication of the mobile terminal by the first authentication unit has succeeded and the cancel information received by the key-unit first reception unit indicates that the reservation for the vehicle or facility corresponding to the first authentication information used for the authentication of the mobile terminal by the first authentication unit has been cancelled.

According to the aspect, the server transmits the cancel information of the reservation for the vehicle or facility to the key unit, and the key unit confirms whether the reservation for the vehicle or facility corresponding to the first authentication information used for the authentication has been cancelled based on the cancel information received from the server. The key unit (the locking and unlocking processing unit) prohibits unlocking of the vehicle or facility when the reservation corresponding to the first authentication information used for the authentication of the mobile terminal has been cancelled. Accordingly, even when a malicious third party has gotten the mobile terminal in which the first authentication information was acquired and stored in advance, unlocking of the vehicle or facility by the mobile terminal is prohibited, for example, by causing a user of the mobile terminal to cancel the reservation for the vehicle or facility using any method. Accordingly, it is possible to prevent a malicious third party form improperly using the vehicle or facility.

In the aspect, the key unit may include a key-unit transmission unit configured to transmit a second request signal including a request for the cancel information corresponding to the first authentication information used for the authentication of the mobile terminal by the first authentication unit to the server when the authentication of the mobile terminal by the first authentication unit has succeeded, the server may include a server reception unit configured to receive the second request signal transmitted from the key unit, and the server transmission unit may be configured to transmit a response signal including the cancel information to the key unit when the second request signal has been received by the server reception unit.

According to the aspect, when the authentication based on the first authentication information transmitted from the mobile terminal has succeeded, the key unit can transmit the second request signal for requesting the cancel information on the reservation for the vehicle or facility corresponding to the first authentication information to the server, and acquire the cancel information from the server. Accordingly, even when a malicious third party having gotten the mobile terminal in which the first authentication information acquired in advance was stored succeeds in authenticating the mobile terminal, the second request signal is immediately transmitted from the key unit to the server with the success of authentication as a trigger, and unlocking of the vehicle or facility using the mobile terminal can be prohibited based on the cancel information transmitted from the server in response to the second request signal. Accordingly, it is possible to prevent a malicious third party from improperly using the vehicle or facility.

In the aspect, the key unit may include a key-unit timer configured to perform clocking, the server may include a server timer configured to perform clocking with higher accuracy than the key-unit timer, the mobile terminal may include a relay unit configured to receive a signal transmitted from one of the server and the key unit to the other from the one and to transmit the received signal to the other, the key-unit transmission unit may be configured to transmit the second request signal including a request for the cancel information to the server and a request for a time of the server timer to the mobile terminal, the relay unit may be configured to receive the second request signal from the key unit and to transmit the second request signal to the server, the server reception unit may be configured to receive the second request signal from the mobile terminal, the server transmission unit may be configured to transmit the response signal to the key unit including the cancel information and the time of the server timer to the mobile terminal when the second request signal has been received by the server reception unit, the relay unit may be configured to receive the response signal from the server and to transmit the response signal to the key unit, the key-unit first reception unit may be configured to receive the response signal from the mobile terminal, and the key-unit timer may be configured to be synchronized with the server timer based on the time of the server timer included in the response signal received by the key-unit first reception unit.

According to the aspect, the key unit synchronizes the time of the key-unit timer with relatively low accuracy with the server timer based on the time of the server timer transmitted from the server. Communication between the key unit and the server is performed via the mobile terminal. The key unit transmits the second request signal including a request for the cancel information and a request for the time of the server timer via the mobile terminal to the server, and the server transmits a response signal including the cancel information and the time of the server timer to the key unit via the mobile terminal in response to reception of the second request signal. Accordingly, the key unit needs to perform synchronization of the time of the key-unit timer with relatively low accuracy in a state in which it can communicate with the mobile terminal. In this case, it is possible to achieve improvement in efficiency of communication between the server, the mobile terminal, and the key unit by employing a configuration in which the second request signal including the acquisition request for the cancel information transmitted to the server and the acquisition request of the time of the server (the server timer) is transmitted with the success of authentication of the mobile terminal which is performed in the state in which communication with the mobile terminal is possible as a trigger, and the cancel information and the time information are simultaneously acquired from the server.

In the aspect, the locking and unlocking system may further include a locking and unlocking device mounted in the vehicle or facility, the key unit may include a storage unit configured to store second authentication information correlated with the vehicle or facility, the locking and unlocking device may include: a locking and unlocking-device reception unit configured to receive a third request signal including the second authentication information from the key unit; a second authentication unit configured to authenticate the key unit based on the second authentication information included in the third request signal when the third request signal has been received by the locking and unlocking-device reception unit; and a locking and unlocking control unit configured to unlock or lock the door of the vehicle or facility when the authentication by the second authentication unit has succeeded, and the locking and unlocking processing unit may be configured to transmit the third request signal including the second authentication information to the locking and unlocking device in a process of unlocking or locking the door of the vehicle or facility.

According to the aspect, the key unit can unlock the vehicle or facility by transmitting the second request signal to the locking and unlocking device disposed in the vehicle or the like. Accordingly, for example, the locking and unlocking system can be embodied in a configuration in which the key unit is added to the locking and unlocking device already mounted in the vehicle or facility.

According to a second aspect of the disclosure, there is provided a key unit configured to unlock or lock a door of a vehicle or facility in response to a first request signal for requesting unlocking or locking of the vehicle or facility which is transmitted from a mobile terminal, the key unit being disposed in the vehicle or facility, the key unit including: a key-unit first reception unit configured to receive cancel information indicating whether a reservation for the vehicle or facility has been cancelled from a server storing information on the reservation for the vehicle or facility; a key-unit second reception unit configured to receive first authentication information correlated with the reservation for the vehicle or facility and a first request signal for requesting unlocking or locking of the door of the vehicle or facility from the mobile terminal; a first authentication unit configured to authenticate the mobile terminal based on the first authentication information when the first authentication information has been received by the key-unit second reception unit; and a locking and unlocking processing unit configured to perform a process of unlocking or locking the door of the vehicle or facility when the authentication of the mobile terminal by the first authentication unit has succeeded and the first request signal has been received by the key-unit second reception unit, wherein the locking and unlocking processing unit is configured to prohibit unlocking of the door of the vehicle or facility based on the first request signal for requesting unlocking of the door, which is transmitted from the mobile terminal, when the authentication of the mobile terminal by the first authentication unit has succeeded and the cancel information received by the key-unit first reception unit indicates that the reservation for the vehicle or facility corresponding to the first authentication information used for the authentication of the mobile terminal by the first authentication unit has been cancelled.

According to a third aspect of the disclosure, there is provided a server configured to communicate with a key unit configured to unlock or lock a door of a vehicle or facility in response to a first request signal for requesting unlocking or locking of the vehicle or facility which is transmitted from a mobile terminal, the key unit being disposed in the vehicle or facility, and to store information on a reservation for the vehicle or facility, the server including: a server transmission unit configured to transmit cancel information indicating whether the reservation for the vehicle or facility has been cancelled to the key unit.

According to the aspects, it is possible to provide a locking and unlocking system that can prevent a malicious third party having gotten a mobile terminal storing authentication information acquired in advance from improperly using a vehicle or facility even when authentication information can be acquired in advance.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 10 is a sequence diagram schematically illustrating an example of operations in a time synchronizing process which is performed by the key unit and the center server and the unlocking process which is performed by the key unit in the locking and unlocking system according to the aspect of the disclosure.

DETAILED DESCRIPTION OF EMBODIMENTS

Hereinafter, an embodiment of the disclosure will be described with reference to the accompanying drawings.

First, a configuration of a locking and unlocking system 1 according to an embodiment of the disclosure will be described below with reference to FIGS. 1 and 2.

Figure 1:
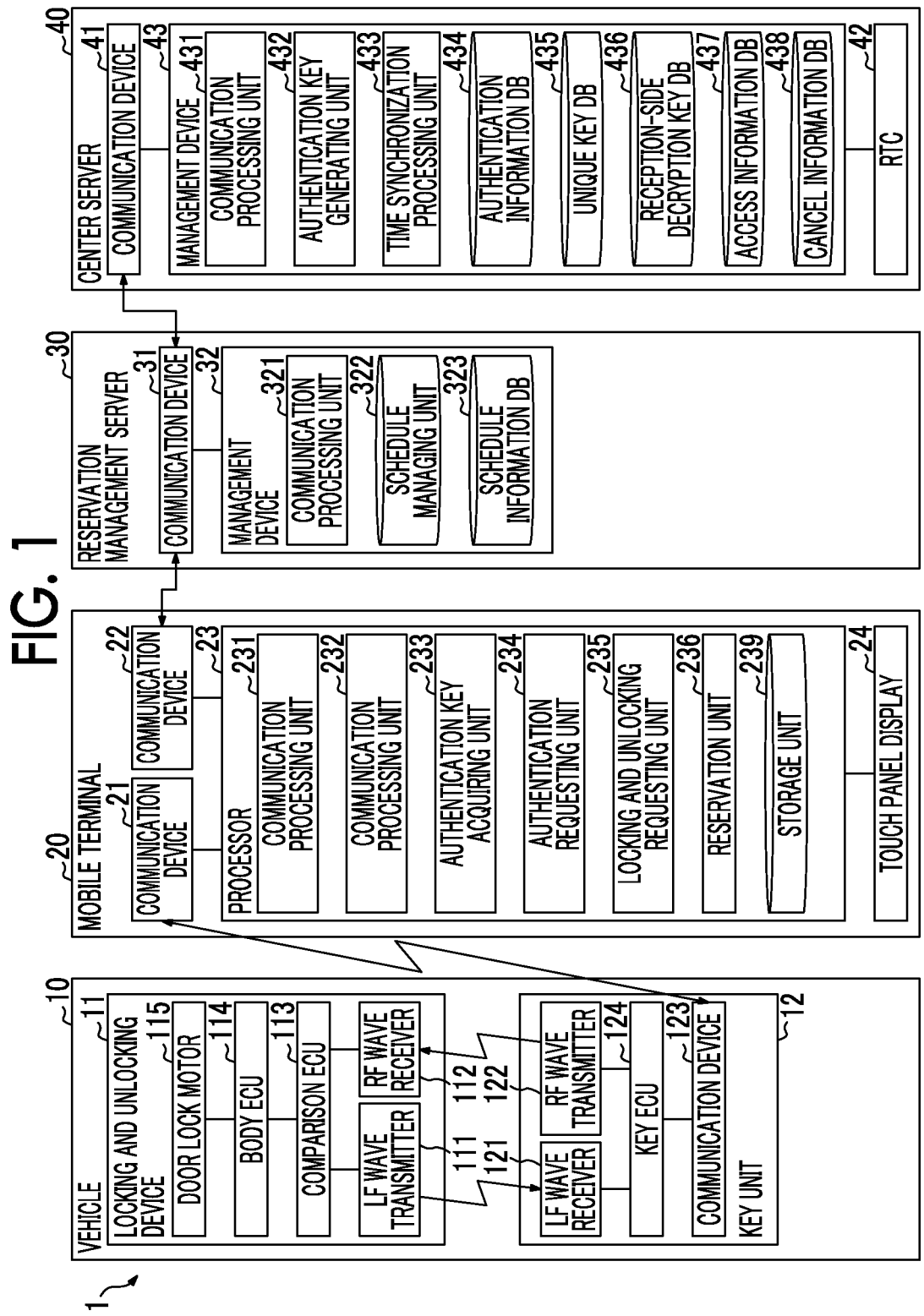
FIG. 1 is a block diagram schematically illustrating an example of a configuration of a locking and unlocking system according to an aspect of the disclosure.
Figure 2:
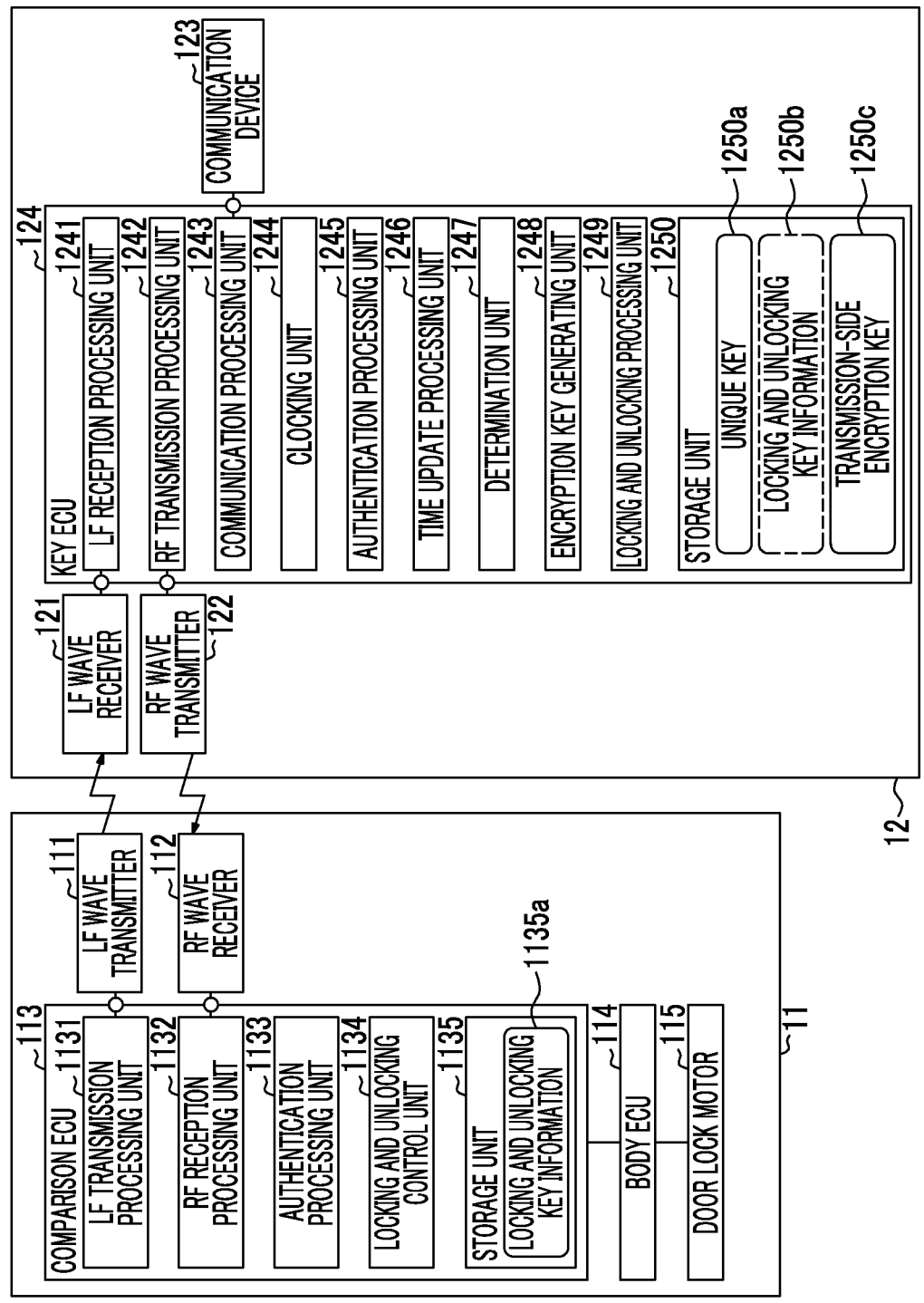
FIG. 2 is a block diagram schematically illustrating an example of a configuration of a locking and unlocking device and a key unit according to the aspect of the disclosure.

FIG. 1 is a block diagram schematically illustrating an example of a configuration of the locking and unlocking system 1 according to this embodiment. FIG. 2 is a block diagram schematically illustrating an example of a configuration of a locking and unlocking device 11 and a key unit 12 which are included in a vehicle 10.

The locking and unlocking system 1 includes a vehicle 10, a mobile terminal 20, a reservation management server 30, and a center server 40.

The vehicle 10 is a locking and unlocking (unlocking and locking) object in the locking and unlocking system 1. The vehicle 10 includes a locking and unlocking device 11 and a key unit 12.

Examples of the vehicle 10 according to this embodiment include a rented car, a shared car (regardless of whether it is provided by a company or personally), and a company car in an organization which can be used by a plurality of users.

The locking and unlocking device 11 is mounted in the vehicle 10, and performs unlocking and locking of a door of the vehicle 10 in response to a locking signal and an unlocking signal (both of which are an example of a third request signal) which are transmitted as radio waves of a radio frequency (RF) band (for example, 300 MHz to 3 GHz) (hereinafter referred to as "RF waves") from the key unit 12. The locking and unlocking device 11 includes a low frequency (LF) wave transmitter 111, an RF wave receiver 112, a comparison electronic control unit (ECU) 113, a body ECU 114, and a door lock motor 115.

The locking and unlocking device 11 operates with electric power which is supplied from an auxiliary battery (not illustrated) mounted in the vehicle 10.

The LF wave transmitter 111 is built into, for example, a center console or a door handle of a vehicle cabin, and transmits radio waves of an LF band (for example, 30 Hz to 300 kHz) (hereinafter referred to as "LF waves") under the control of the comparison ECU 113 (an LF transmission processing unit 1131 which will be described later).

The RF wave receiver 112 is provided, for example, in a trim of a trunk of the vehicle 10 and receives RF waves under the control of the comparison ECU 113 (an RF reception processing unit 1132 which will be described later).

The comparison ECU 113 is an electronic control unit that performs control of unlocking and locking of a door of the vehicle 10 in response to the unlocking signal and the locking signal received from the key unit 12. The comparison ECU 113 is mainly constituted, for example, by a microcomputer and performs various control processes by causing a CPU to execute a program stored in a ROM. The comparison ECU 113 includes an LF transmission processing unit 1131, an RF reception processing unit 1132, an authentication processing unit 1133, and a locking and unlocking control unit 1134 as functional units which are embodied by causing the CPU to execute one or more programs. The comparison ECU 113 includes a storage unit 1135 which is embodied as a storage area of an internal memory.

The LF transmission processing unit 1131 performs a process of transmitting LF waves to the inside and the outside of the vehicle via the LF wave transmitter 111.

The RF reception processing unit 1132 (an example of a locking and unlocking-device reception unit) performs a process of receiving RF waves via the RF wave receiver 112. Specifically, the RF reception processing unit 1132 receives an unlocking signal and a locking signal which are transmitted as RF waves from the key unit.

When the RF reception processing unit 1132 has received an unlocking signal or a locking signal, the authentication processing unit 1133 (an example of a second authentication unit) performs authentication of a transmission source (the key unit 12) of the unlocking signal or the locking signal based on locking and unlocking key information (locking and unlocking key information 1250$b$ which will be described later) included in the unlocking signal or the locking signal. Specifically, the authentication processing unit 1133 determines that the authentication has succeeded when locking and unlocking key information 1135$a$ which is registered in advance in the storage unit 1135 matches the locking and unlocking key information included in the unlocking signal or the locking signal, and determines that the authentication has failed when both pieces of information do not match each other.

When the authentication by the authentication processing unit 1133 succeeds, the locking and unlocking control unit 1134 transmits an unlocking command (when the RF reception processing unit 1132 has received the unlocking signal) or a locking command (when the RF reception processing unit 1132 has received the locking signal) to the body ECU 114 via an on-board network such as a controller area network (CAN).

The body ECU 114 is an electronic control unit that controls operation of the door lock motor 115 which is connected thereto via a one-to-one communication line or the like in a communicable manner. The body ECU 114 outputs a control command for causing the door lock motor 115 to perform an unlocking operation in accordance with the unlocking command from the comparison ECU 113. The body ECU 114 outputs a control command for causing the door lock motor 115 to perform a locking operation in accordance with the locking command from the comparison ECU 113.

The door lock motor 115 is an existing electrical actuator that unlocks and locks the door of the vehicle 10 (which includes a trunk lid, a back door, and the like) in accordance with a control command from the body ECU 114.

The key unit 12 is mounted in the vehicle 10 (in the vehicle cabin) and transmits an unlocking signal and a locking signal as RF waves to the locking and unlocking device 11 in response to the unlocking request and the locking request (both of which are an example of the first request signal) which are transmitted from the mobile terminal 20. The key unit 12 includes an LF wave receiver 121, an RF wave transmitter 122, a communication device 123, and a key ECU 124.

The key unit 12 may be disposed at a position (for example, in a glove box or a center console box) which is not visible from users sifting on seats of the vehicle 10. The key unit 12 may be fixed to the vehicle 10 or may not be fixed thereto. The key unit 12 may be configured to operate with a built-in button battery or the like or may be configured to operate with electric power which is supplied from an auxiliary battery mounted in the vehicle 10.

The LF wave receiver 121 performs a process of receiving LF waves under the control of the key ECU 124 (an LF reception processing unit 1241 which will be described later).

The RF wave transmitter 122 performs a process of transmitting RF waves under the control of the key ECU 124 (an RF transmission processing unit 1242 which will be described later).

The communication device 123 is a device that communicates with the mobile terminal 20 at a relatively short distance (a distance at which communication between the inside and outside of the vehicle is possible) in accordance with a predetermined communication standard under the control of the key ECU 124. The communication device 123 may be, for example, a BLE communication module that communicates with the mobile terminal 20 in accordance with a communication standard of Bluetooth (registered trademark) low energy (BLE). The following description is based on the premise that the communication standard employed by the communication device 123 is based on BLE communication.

The communication device 123 may be a communication device based on a short-range communication standard (for example, a near-field communication (NFC) standard) having a very short communication range. In this case, the communication device 123 may be built in a position close to a body surface of the outside of the vehicle 10 (for example, in a door handle) or the like. Accordingly, even when a communication range of the communication device 123 is very short, the key unit 12 (the key ECU 124) can communicate with the mobile terminal 20 outside the vehicle.

The key ECU 124 is an electronic control unit that performs a control process of transmitting a locking signal and an unlocking signal to the locking and unlocking device 11 in response to an unlocking request and a locking request which are received from the mobile terminal 20. The key ECU 124 is mainly constituted, for example, by a microcomputer and performs various control processes by causing a CPU to execute a program stored in a ROM. The key ECU 124 includes an LF reception processing unit 1241, an RF transmission processing unit 1242, a communication processing unit 1243, a clocking unit 1244, an authentication processing unit 1245, a time update processing unit 1246, a determination unit 1247, an encryption key generating unit 1248, and a locking and unlocking processing unit 1249 as functional units which are embodied by executing one or more programs. The key ECU 124 also includes, for example, a storage unit 1250 (an example of a first storage unit and a second storage unit) which is embodied as a storage area of an internal memory.

The LF reception processing unit 1241 performs a process of receiving LF waves via the LF wave receiver 121. For example, the LF reception processing unit 1241 receives LF waves which are transmitted from the locking and unlocking device 11.

The RF transmission processing unit 1242 performs a process of transmitting RF waves via the RF wave transmitter 122. For example, the RF transmission processing unit 1242 performs a process of transmitting an unlocking signal (when an unlocking request is received by the communication processing unit 1243) including locking and unlocking key information 1250$b$ (an example of the second authentication information) which will be described later and a locking signal (when a locking request is received by the communication processing unit 1243) including locking and unlocking key information 1250b in response to a transmission request from the locking and unlocking processing unit 1249.

The communication processing unit 1243 (an example of the key-unit first reception unit, the key-unit second reception unit, and the key-unit transmission unit) performs a communication process with the mobile terminal 20 via the communication device 123. For example, the communication processing unit 1243 receives an authentication request including an authentication key which will be described later from the mobile terminal 20. For example, the communication processing unit 1243 receives an unlocking request and a locking request from the mobile terminal 20.

As will be described later, the key unit 12 communicates with the center server 40 via the mobile terminal 20, but may be configured to directly communicate with the center server 40. For example, the key unit 12 may be configured to access a predetermined communication network including a mobile phone network or the Internet via a data communication module (DCM) mounted in the vehicle 10 and to communicate with the center server 40.

The clocking unit 1244 (an example of the key-unit timer) performs a clocking process by software and generates a time in the key unit 12. For example, the time of the clocking unit 1244 has lower accuracy than that of a real time clock (RTC) of hardware. The time of the clocking unit 1244 is updated to a time of the center server 40 (specifically, a time of an RTC 42 which will be described later) as will be described later. That is, the time of the clocking unit 1244 is synchronized with the time of the center server 40.

When an authentication request including an authentication key (an example of the first authentication information) correlated with the key unit 12 is received from the target mobile terminal 20 by the communication processing unit 1243, the authentication processing unit 1245 (an example of the first authentication unit) performs authentication of the mobile terminal 20 based on the authentication key. When a re-authentication request for requesting re-access by BLE communication between the key unit 12 the mobile terminal 20 authenticated by the communication processing unit 1243 is received from the mobile terminal 20, the authentication processing unit 1245 performs challenge-response authentication (hereinafter referred to as "re-authentication") of the mobile terminal 20. Details thereof will be described later.

When the authentication succeeds, the authentication processing unit 1245 performs a process of restoring the locking and unlocking key information 1250b stored in the storage unit 1250 to a usable state. The locking and unlocking key information 1250b is stored, for example, in a state in which the locking and unlocking key information is inaccessible, encrypted, or the like and is not usable for authentication in the locking and unlocking device 11. Accordingly, when the authentication of the mobile terminal 20 succeeds, the authentication processing unit 1245 changes a right to access the storage unit 1250 for changing the locking and unlocking key information 1250b to an accessible state or decrypts the encrypted locking and unlocking key information 1250b based on the authentication key. Accordingly, the RF transmission processing unit 1242 can access locking and unlocking key information 1250b which is normally inaccessible and transmit an unlocking signal or a locking signal including the locking and unlocking key information 1250b to the locking and unlocking device 11, or can transmit an unlocking signal or a locking signal including the decrypted locking and unlocking key information 1250b to the locking and unlocking device 11. Accordingly, the locking and unlocking device 11 (specifically, the authentication processing unit 1133) can perform appropriate authentication based on the locking and unlocking key information 1250b included in the unlocking signal and the locking signal. Even when a situation in which a malicious third party improperly acquires the key unit 12 occurs, the locking and unlocking key information 1250b in the key unit 12 is inaccessible or encrypted and thus it is possible to curb theft of the vehicle 10.

The time update processing unit 1246 sends a transmission request to the communication processing unit 1243, and transmits a time acquisition request (an example of the second request signal) for requiring acquisition of the time of the center server 40 to the center server 40 via the communication processing unit 1243 in a relay manner of the mobile terminal 20 and the reservation management server 30. When the time information from the center server 40 is received via the reservation management server 30 and the mobile terminal 20 by the communication processing unit 1243, the time update processing unit 1246 updates the time of the clocking unit 1244 with the time information and synchronizes the time with the time of the center server 40 (that is, the time of the RTC 42 which will be described later).

The determination unit 1247 determines whether a current time is within a reservation time for the vehicle 10 corresponding to the authentication key which has been used for the authentication by the authentication processing unit 1245. The determination unit 1247 determines whether the reservation for the vehicle 10 corresponding to the authentication key which has been used for the authentication by the authentication processing unit 1245 has been cancelled. Details thereof will be described later.

The encryption key generating unit 1248 generates a communication encryption key which is used for the mobile terminal 20 of which the authentication by the authentication processing unit 1245 has succeeded (that is, the authenticated mobile terminal 20) to transmit a signal to the key unit 12. The encryption key generating unit 1248 also generates a communication decryption key for decrypting data encrypted with the generated encryption key. The encryption key generating unit 1248 generates the communication encryption key such that the generated communication encryption key is different from a communication encryption key which was generated in the past. As will be described later, the communication encryption key is transmitted to the key unit 12 and the communication decryption key is stored in the storage unit 1250. Accordingly, by causing the mobile terminal 20 to encrypt various commands (for example, an unlocking request or a locking request) for the key unit 12 using the communication encryption key and to transmit the encrypted commands to the key unit 12, the authentication processing unit 1245 does not need to perform authentication of the mobile terminal 20 using the encryption key every time various commands are received by the communication processing unit 1243. Accordingly, as will be described later, use of the authentication key can be limited to one time and, for example, when an unlocking request or a locking request encrypted using the communication encryption key, that is, an unlocking request or a locking request which can be decrypted using the communication decryption key, is received by the communication processing unit 1243, the locking and unlocking processing unit 1249 can determine that the received unlocking request or the received locking request is a command from the authenticated mobile terminal 20 and can perform a process of unlocking or locking the door of the vehicle 10. Details thereof will be described later.

When the authentication of the mobile terminal 20 by the authentication processing unit 1245 succeeds and the unlocking request or the locking request is received from the mobile terminal 20 by the communication processing unit 1243, the locking and unlocking processing unit 1249 performs the process of unlocking or locking the door of the vehicle 10. Specifically, when the authentication of the mobile terminal 20 by the authentication processing unit 1245 succeeds and the unlocking request or the locking request which can be decrypted using the communication encryption key is received from the mobile terminal 20 as described above, the locking and unlocking processing unit 1249 performs the process of unlocking or locking the door of the vehicle 10 by sending a transmission request to the RF transmission processing unit 1242 and transmitting an unlocking signal or a locking signal to the locking and unlocking device 11 via the RF transmission processing unit 1242 and the RF wave transmitter 122. Details thereof will be described later.

A unique key 1250a, locking and unlocking key information 1250b, a transmission-side encryption key 1250c, and the like are stored in the storage unit 1250 in advance.

The unique key 1250a is a set of an encryption key and a decryption key which are provided to correspond to the key unit 12 as will be described later, and is specifically an encryption key and a decryption key which are used to encrypt data on the transmission side and to decrypt encrypted data on the reception side at the time of communication between the key unit 12 and the center server 40. As will be described later, the same unique key as the unique key 1250a is also stored in a unique key DB 435 of the center server 40.

The transmission-side encryption key 1250c is used to encrypt the communication encryption key when the communication encryption key generated by the encryption key generating unit 1248 is transmitted from the key unit 12 to the mobile terminal 20.

Examples of the mobile terminal 20 include a smartphone and a tablet terminal. The mobile terminal 20 can bidirectionally communicate with the reservation management server 30 and the center server 40 via a predetermined communication network (for example, a mobile phone network with a plurality of base stations as terminals or the Internet). The following description is based on the premise that transmission and reception of signals between the mobile terminal 20 and the center server 40 are performed via the reservation management server 30. The mobile terminal 20 includes communication devices 21 and 22, a processor 23, and a touch panel display (hereinafter simply referred to as a display) 24.

In this embodiment, the mobile terminal 20 communicates with the center server 40 via the reservation management server 30, but may be configured to directly bidirectionally communicate with the center server 40 via a predetermined communication network.

The communication device 21 is a device that communicates with the mobile terminal 20 based on the same communication standard as in the communication device 123. The communication device 21 is, for example, a BLE communication module in this embodiment as described above.

The communication device 22 is a device that communicates with the reservation management server 30 and the center server 40 via a predetermined communication network.

The processor 23 includes a CPU and an auxiliary storage device and includes a communication processing unit 231, a communication processing unit 232, an authentication key acquiring unit 233, an authentication requesting unit 234, a locking and unlocking requesting unit 235, and a reservation unit 236 as functional units which are embodied by causing the CPU to execute one or more programs. The processor 23 also includes a storage unit 239 (an example of the first storage unit) which is embodied as a storage area in the auxiliary storage device.

The communication processing unit 231 (an example of the terminal transmission unit) wirelessly communicates with the key unit 12 using the communication device 21, and transmits and receives various signals. For example, the communication processing unit 231 transmits an authentication request including an authentication key and a re-authentication request including a response which will be described later to the key unit 12 in response to a transmission request from the authentication requesting unit 234. For example, the communication processing unit 231 transmits an unlocking request and a locking request to the key unit 12 in response to a request from the locking and unlocking requesting unit 235. For example, in this embodiment, the key unit 12 and the center server 40 employ a configuration for performing bidirectional communication via the mobile terminal 20, and the communication processing unit 231 sends a signal which should be transmitted from the key unit 12 to the center server 40 to the communication processing unit 232 to transmit the signal to the reservation management server 30, and transmits a signal which should be transmitted from the center server 40 to the key unit 12 and which has been sent from the communication processing unit 232 to the key unit 12.

The communication processing unit 232 wirelessly communicates with a base station using the communication device 22 and transmits and receives various signals such as a data signal and a control signal. Specifically, the communication processing unit 232 transmits and receives various signals to and from the reservation management server 30 and the center server 40 via a predetermined communication network including a mobile phone network with a base station as a terminal or the Internet. For example, in this embodiment, the communication processing unit 232 transmits a signal with the center server 40 as a destination to the center server 40 via the reservation management server 30. Since the above-mentioned configuration is employed, the communication processing unit 232 on the transmission side may transmit a signal including destination information to the reservation management server 30, or the reservation management server 30 on the reception side may automatically transmit a prescribed type of signal among a plurality of types of signals which are transmitted from the mobile terminal 20 to the reservation management server 30 to the center server 40. For example, in this embodiment, as described above, the key unit 12 and the center server 40 employ a configuration in which bidirectional communication is performed via the mobile terminal 20, the communication processing unit 232 sends a signal with the key unit 12 as a destination transmitted from the center server 40 via the reservation management server 30 to the communication processing unit 231 to transmit the signal to the key unit 12, or transmits a signal with the center server 40 as a destination transmitted from the key unit 12 and which has been set from the communication processing unit 231 to the reservation management server 30.

That is, communication processing unit 231 and the communication processing unit 232 are an example of a relay unit that receive a signal which is transmitted from one of the center server 40 and the key unit 12 to the other and transmits (sends) the received signal to the other.

The authentication key acquiring unit 233 displays a GUI as an operation screen on the display 24 and performs a process of acquiring the authentication key from the center server 40 in response to a user's predetermined operation on the GUI of the display 24. Specifically, the authentication key acquiring unit 233 sends a transmission request to the communication processing unit 232 in response to a user's predetermined operation and transmits an authentication key acquisition request for requesting acquisition of an authentication key to the center server 40 via the communication processing unit 232. When the authentication key returned from the center server 40 in response to the authentication key acquisition request is received by the communication processing unit 232, the authentication key acquiring unit 233 performs a process of storing the authentication key in the storage unit 239. In this embodiment, a user can acquire the authentication key in the mobile terminal 20 in advance, that is, before the start time of the reservation for the vehicle 10. Details thereof will be described later.

The authentication requesting unit 234 sends a transmission request to the communication processing unit 231, and transmits an authentication request for requesting authentication of the mobile terminal 20 as a remote controller for unlocking and locking the door of the vehicle 10 to the key unit 12 of the vehicle 10 via the communication processing unit 231. For example, when a user alights from the vehicle 10 or the like such that BLE communication is temporarily cut off between the authenticated mobile terminal 20 and the key unit 12 in the accessed state after the transmission request has been sent to the communication processing unit 231, the authentication requesting unit 234 transmits again a re-authentication request for requesting re-access to the key unit 12 to the key unit 12 of the vehicle 10 via the communication processing unit 231. Details thereof will be described later.

The locking and unlocking requesting unit 235 displays a graphical user interface (GUI) as an operation screen on the display 24. Then, the locking and unlocking requesting unit 235 sends a transmission request to the communication processing unit 231 in response to a predetermined operation on the GUI and transmits an unlocking request including an authentication key or a locking request including an authentication key to the key unit 12 via the communication processing unit 231. Specifically, the locking and unlocking requesting unit 235 transmits an unlocking request and a locking request, which has been received from the mobile terminal 20 by the communication processing unit 231 and encrypted using the communication encryption key stored in the storage unit 239, to the key unit 12 as will be described later. For example, an unlocking button for requesting unlocking of the vehicle 10 and a locking button for requesting locking of the vehicle 10 are displayed on the GUI, and the locking request is transmitted by touching the locking button, and the unlocking request is transmitted by touching the unlocking button. Details thereof will be described later.

A user's operation for transmitting the locking request and the unlocking request to the key unit 12 may be an operation on an operation unit as hardware disposed in the mobile terminal 20 instead of the operation of touching the display 24. When an authentication key is not stored in the storage unit 239, a predetermined operation for transmitting the locking request and the unlocking request may be invalidated or the locking request and the unlocking request may be transmitted without including the authentication key.

The reservation unit 236 displays a GUI as an operation unit on the display 24 and makes a reservation for the vehicle 10 in response to a user's predetermined operation on the GUI on the display 24. For example, the reservation unit 236 may request schedule information of the vehicle 10 (a current reservation state) for the reservation management server 30 via the communication processing unit 232. At this time, the reservation unit 236 transmits a request including identification information unique to the vehicle 10 (for example, a vehicle index number (VIN)) and a password to the reservation management server 30. The schedule information of the vehicle 10 stored in the reservation management server 30 (specifically, a schedule information DB 323 which will be described later) includes reservation information for the vehicle 10 (a start time and an end time of each reservation, identification information of a user, and the like). The reservation unit 236 displays the schedule information of the vehicle 10 (the current reservation state) received from the reservation management server 30 via the communication processing unit 232 on the display 24. Accordingly, a user can confirm an empty time period based on the schedule information displayed on the display and make a reservation for the vehicle 10 in the empty time period (a time period in which a reservation has not been made). When a user makes a reservation at a specific time, the reservation unit 236 requests updating of the schedule information including newly input reservation information (a start time and an end time of each reservation, identification information of a user, and the like) via the communication processing unit 232. Accordingly, the new reservation from the user of the mobile terminal 20 is reflected in the schedule information of the vehicle 10 in the schedule information DB 323.

The reservation unit 236 cancels a reservation for the vehicle 10 in response to a user's predetermined operation on the GUI on the display 24. When a user cancels a reservation, the reservation unit 236 requests deleting of the schedule information including the cancelled reservation information (a start time and an end time of each reservation, identification information of a user, and the like). Accordingly, details of the cancelled reservation are deleted from the schedule information of the vehicle 10 in the schedule information DB 323.

A user can make a reservation for the vehicle 10 or cancel a reservation using a terminal other than the mobile terminal 20, specifically, a stationary terminal (such as a desktop computer) instead of the mobile terminal, and making a reservation for the vehicle 10 and cancelling of a reservation may be performed from the other terminal.

The reservation management server 30 manages a schedule (reservations) of the vehicle 10. The reservation management server 30 includes, for example, a cloud application (not illustrated) and a user can prepare and update schedule information using the cloud application with the mobile terminal 20 or another terminal via a predetermined communication network such as a mobile phone network or the Internet.

A schedule of the vehicle 10 represents a use schedule (a reservation) of the vehicle 10.

The reservation management server 30 includes a communication device 31 and a management device 32.

The communication device 31 is a device that communicates with the mobile terminal 20 and the center server 40 via a predetermined communication network.

The management device 32 is mainly constituted by one or more computers and includes a communication processing unit 321 and a schedule managing unit 322 as functional units which are embodied by causing a CPU to execute one or more programs. The management device 32 includes a schedule information DB 323 stored in the auxiliary storage device therein and the schedule information DB 323 includes schedule information of the vehicle 10.

The communication processing unit 321 transmits and receives various signals to and from the mobile terminal 20 and the center server 40 using the communication device 31. For example, the communication processing unit 321 receives a signal for requesting disclosure of the schedule information of the vehicle 10 from the mobile terminal 20 and returns the schedule information of the vehicle 10 (reference data) to the mobile terminal 20 in response to the request from the schedule managing unit 322 corresponding to the signal. For example, the communication processing unit 321 receives a signal for requesting updating of the schedule information from the mobile terminal 20 and returns a signal indicating completion of updating to the mobile terminal 20 in response to a request from the schedule managing unit 322 corresponding to the signal. For example, the communication processing unit 321 transmits a cancel notification which will be described later to the center server 40 in response to a request from the schedule managing unit 322. In this embodiment, as described above, a configuration in which communication between the mobile terminal 20 and the center server 40 is performed via the reservation management server 30 is employed, and the communication processing unit 321 relays and receives a signal which should be transmitted from the mobile terminal 20 (or the key unit 12) to the center server 40 and transmits the signal to the center server 40, and relays and transmits a signal which should be transmitted from the center server 40 to the mobile terminal 20 (or the key unit 12) to the mobile terminal.

The schedule managing unit 322 manages, for example, the schedule information of the vehicle 10 stored in the schedule information DB 323 in response to various inputs from a user using the cloud application. When the communication processing unit 321 receives a signal for requesting disclosure of the schedule information of the vehicle 10 from the mobile terminal 20 (another terminal when a reservation for the vehicle 10 is performed with another terminal), the schedule managing unit 322 first determines whether the signal is an authorized access based on the identification information (a user ID) and a password included in the signal. When the signal is an authorized access, the schedule managing unit 322 extracts the schedule information of the vehicle 10 from the schedule information DB 323 and transmits the extracted schedule information to the mobile terminal 20 (or another terminal) via the communication processing unit 321. When the communication processing unit 321 receives a signal including a request for requesting updating of the schedule information of the vehicle 10 from the mobile terminal 20 (or another terminal), the schedule managing unit 322 updates the schedule information of the vehicle 10 in the schedule information DB 323 depending on details of the request (that is, change details such as added reservation information or reservation information which is deleted due to cancellation of a reservation). When a reservation for the vehicle 10 is cancelled using the mobile terminal 20 or another terminal, the schedule managing unit 322 sends a transmission request to the communication processing unit 321 and transmits a cancel notification including reservation information (such as a start time and an end time of each reservation and identification information of a user) of the cancelled reservation for the vehicle 10 to the center server 40 via the communication processing unit 321.

The center server 40 manages a use state of the vehicle 10. The center server 40 includes a communication device 41, a real time clock (RTC) 42, and a management device 43.

The communication device 41 is a device that communicates with the mobile terminal 20 and the reservation management server 30 via a predetermined communication network.

The RTC 42 (an example of the server timer) performs clocking using hardware and generates a time in the center server 40. The time of the RTC has higher accuracy than that of the clocking unit 1244 of the key unit 12 using software.

The RTC 42 may be disposed in the management device 43.

The management device 43 is mainly constituted by one or more computers and includes a communication processing unit 431, an authentication key generating unit 432, and a time synchronization processing unit 433 as functional units which are embodied by causing a CPU to execute one or more programs. The management device 43 includes an authentication information DB 434, a unique key DB 435, a reception-side decryption key DB 436, an access information DB 437, and a cancel information DB 438 which are stored in an internal auxiliary storage device.

The communication processing unit 431 (an example of the server transmission unit and the server reception unit) transmits and receives various signals to and from the mobile terminal 20 and the reservation management server 30 using the communication device 31.

When an authentication key acquisition request is received from the mobile terminal 20 via the reservation management server 30 by the communication processing unit 431, the authentication key generating unit 432 generates an authentication key correlated with the key unit 12 (that is, unique to the key unit 12). The authentication key generating unit 432 generates unique identification information (an issuance ID) correlated with the generated authentication key at the time of generating the authentication key. For example, the authentication key includes unique information (key-unit unique information) which is prescribed for the key unit 12. The authentication key includes reservation information such as a start time and an end time of a reservation for the vehicle 10 which is included in the authentication key acquisition request. That is, the authentication key generating unit 432 generates an authentication key which is correlated with the key unit 12 and correlated with reservation details for the vehicle 10. The authentication key generating unit 432 sends a transmission request to the communication processing unit 431 and transmits authentication key information including the generated authentication key to the mobile terminal 20 via the communication processing unit 431 in a relay manner by the reservation management server 30.

The time synchronization processing unit 433 synchronizes the time of the key unit 12 (that is, the time of the clocking unit 1244) with the time of the center server 40 (that is, the time of the RTC 42) in response to a time acquisition request which is received from the key unit 12 via the mobile terminal 20 and the reservation management server 30 by the communication processing unit 431. When the time acquisition request is received by the communication processing unit 431, the time synchronization processing unit 433 decrypts data of the time acquisition request using the unique key (a decryption key of a set of an encryption key and a decryption key), which is stored in the unique key DB 435, corresponding to the key unit 12, acquires the time of the RTC 42, and generates time information including the acquired time. At this time, the time synchronization processing unit 433 generates time information including a cancel flag F indicating whether a reservation for the vehicle 10 corresponding to the issuance ID of the authentication key included in the time acquisition request has been cancelled, and encrypts the generated time information using the unique key (an encryption key of a set of an encryption key and a decryption key) corresponding to the key unit 12. The time synchronization processing unit 433 sends a transmission request to the communication processing unit 431 and transmits the encrypted time information to the key unit 12 via the communication processing unit 431, the reservation management server 30, and the mobile terminal 20.

Key-unit unique information included in a part of the authentication key which is generated by the authentication key generating unit 432 is stored in the authentication information DB 434 in correlation with the identification information unique to the key unit 12.

The unique key (a set of an encryption key and a decryption key) corresponding to the key unit 12 is stored in the unique key DB 435 in correlation with the identification information unique to the key unit 12. The authentication key generating unit 432 encrypts the authentication key information including the generated authentication key using the unique key and then transmits the authentication key information to the mobile terminal 20 via the communication processing unit 431.

The reception-side decryption key DB 436 stores a reception-side decryption key which forms a pair along with a transmission-side encryption key 1250c stored in the key unit 12 (the storage unit 1250) and which is used to decrypt data encrypted using the transmission-side encryption key 1250c. The reception-side decryption key is transmitted to the mobile terminal 20 in a state in which the reception-side decryption key is included in the authentication key information as will be described later.

The access information DB 437 stores information (BLE access information) for allowing the mobile terminal 20 to access the key unit 12 in a communicable manner in correlation with the identification information unique to the key unit 12. The BLE access information includes, for example, a device ID of the communication device 123 of the key unit 12 or a service UUID at the time of advertisement by the key unit 12.

The cancel information DB 438 stores cancel information of a reservation for the vehicle 10 corresponding to the issued authentication key transmitted already to the mobile terminal 20 in correlation with the issuance ID of the issued authentication key. The cancel information stored in the cancel information DB 438 is generated based on the cancel notification transmitted from the reservation management server 30 by the communication processing unit 431.

Operations from reservation for the vehicle 10 to acquisition of an authentication key by the mobile terminal 20 in the locking and unlocking system 1 will be described below with reference to FIG. 3.

Figure 3:
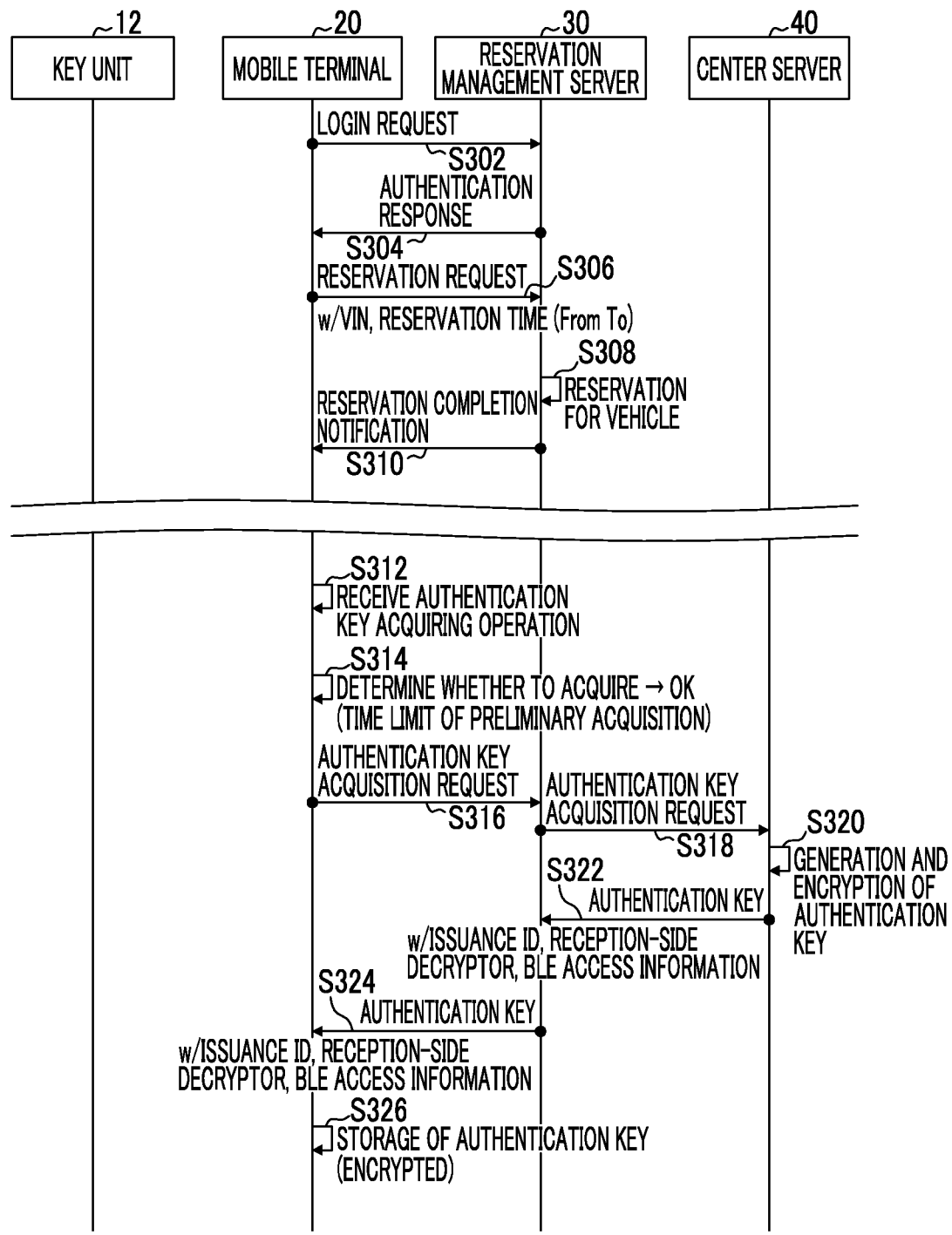
FIG. 3 is a sequence diagram schematically illustrating an example of operations from a reservation for a vehicle to acquisition of an authentication key by a mobile terminal in the locking and unlocking system according to the aspect of the disclosure.

FIG. 3 is a sequence diagram schematically illustrating a series of operations from reservation for the vehicle 10 to acquisition of an authentication key by the mobile terminal 20 in the locking and unlocking system 1.

In Step S302, the reservation unit 236 of the mobile terminal 20 sends a transmission request to the communication processing unit 231 in response to a predetermined operation (for example, an operation of inputting a user ID preset for a user carrying the mobile terminal 20 and a password) on the GUI on the display 24, and transmits a login request including the user ID and the password to the reservation management server 30 via the communication processing unit 231.

In Step S304, the schedule managing unit 322 of the reservation management server 30 performs authentication of whether this access is an authorized access, that is, user authentication, based on the user ID and the password of the login request received from the mobile terminal 20 via the communication processing unit 321, and transmits an authentication response to the mobile terminal 20 via the communication processing unit 321 when the user authentication succeeds.

In Step S306, the reservation unit 236 of the mobile terminal 20 transmits a reservation request including identification information (VIN) of the vehicle 10 and a start time and an end time of the reservation to the reservation management server 30 via the communication processing unit 231 in response to a user's predetermined operation of the GUI of the display 24.

In Step S308, the schedule managing unit 322 of the reservation management server 30 updates the schedule information of the vehicle 10 stored in the schedule information DB 323 depending on details of the reservation request received by the communication processing unit 321, and completes the reservation for the vehicle 10.

In Step S310, the schedule managing unit 322 of the reservation management server 30 transmits a reservation completion notification to the mobile terminal 20 via the communication processing unit 321.

As described hitherto, the reservation for the vehicle 10 is completed through Steps S302 to S310.

Thereafter, in Step S312, the authentication key acquiring unit 233 of the mobile terminal 20 receives a user's authentication key acquiring operation of the GUI of the display 24.

In Step S314, the authentication key acquiring unit 233 of the mobile terminal 20 determines whether an authentication key is able to be acquired. Specifically, the authentication key acquiring unit 233 determines whether requirements for a time limit associated with preliminary acquisition of an authentication key has been satisfied, that is, whether a current time has reached a predetermined time (for example, 10 minutes) before the start time of the reservation for the vehicle 10. When the current time reaches the predetermined time before the start time of the reservation for the vehicle 10, the authentication key acquiring unit 233 performs Step S316. On the other hand, when the current time has not reached the predetermined time before the start time of the reservation for the vehicle 10, the authentication key acquiring unit 233 invalidates the user's authentication key acquiring operation and does not transmit an authentication key acquisition request. Accordingly, by enabling preliminary acquisition of an authentication key before the start time of the reservation for the vehicle 10, it is possible to unlock the vehicle 10 and to start use of the vehicle 10, for example, even when the mobile terminal 20 is located out of a coverage of a predetermined communication network at the time of starting use of the vehicle 10. On the other hand, by providing the time limit for acquisition of an authentication key (that is, an authentication key can be acquired only after a time point which is a predetermined time before the start time of the reservation for the vehicle 10), for example, it is possible to prohibit an opportunity of unauthorized use of the vehicle 10 before the start time of the reservation for the vehicle 10 using an authentication key preliminarily acquired by a user and to prevent unauthorized use of the vehicle 10.

In Step S316, the authentication key acquiring unit 233 transmits an authentication key acquisition request including identification information unique to the mobile terminal 20 (for example, a terminal ID), the identification information VIN of the vehicle 10 which is a reservation target, and the start time and the end time of the reservation to the reservation management server 30 via the communication processing unit 231.

In Step S318, the communication processing unit 321 of the reservation management server 30 transmits the authentication key acquisition request to the center server 40 when the authentication key acquisition request is received from the mobile terminal 20.

In Step S320, the authentication key generating unit 432 of the center server 40 generates an authentication key correlated with the key unit 12 and reservation details for the vehicle 10, that is, an authentication key including key-unit unique information and a start time and an end time of the reservation for the vehicle 10, in response to the authentication key acquisition request received by the communication processing unit 431 as described above. Then, the authentication key generating unit 432 encrypts the authentication key using a unique key corresponding to the key unit 12, which is stored in the unique key DB 435, as described above.

In Step S322, the authentication key generating unit 432 of the center server 40 transmits authentication key information including an issuance ID of the authentication key, a reception-side decryption key, and BLE access information in addition to the encrypted authentication key to the reservation management server 30 via the communication processing unit 431.

In Step S324, the communication processing unit 321 of the reservation management server 30 transmits the authentication key information to the mobile terminal 20 when the authentication key information is received from the center server 40.

In Step S326, the authentication key acquiring unit 233 of the mobile terminal 20 stores the authentication key, the issuance ID, the reception-side decryption key, and the BLE access information which are included in the authentication key information received by the communication processing unit 231 in the storage unit 239.

As described hitherto, acquisition of an authentication key by the mobile terminal 20 is completed through Steps S312 to S326.

Operations of authenticating the mobile terminal 20 in the locking and unlocking system 1 will be described below with reference to FIGS. 4 to 6.

Figure 4:
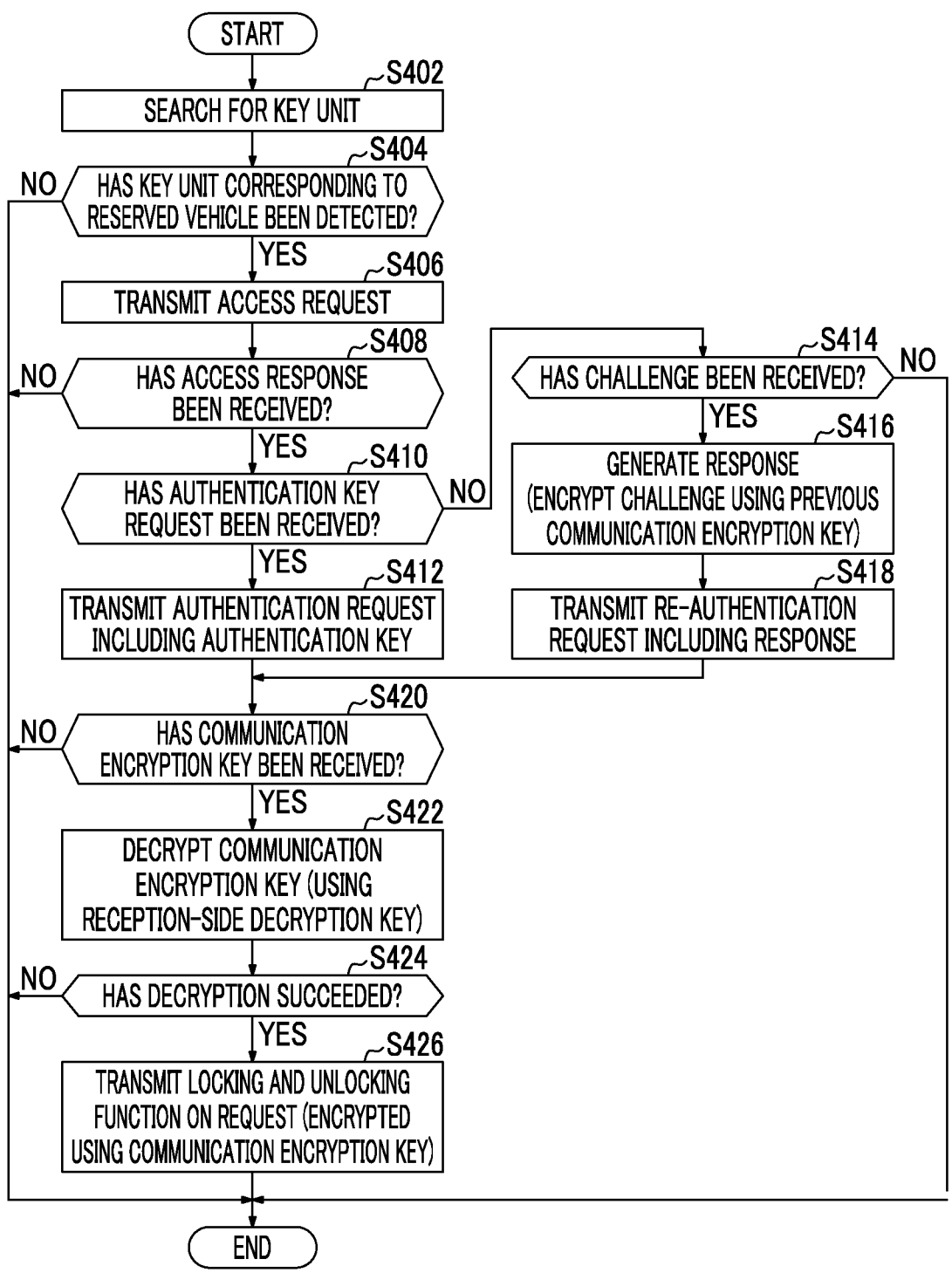
FIG. 4 is a flowchart schematically illustrating an example of a process (a locking and unlocking function starting process) of starting a locking and unlocking function which is performed by a processor of a mobile terminal according to the aspect of the disclosure.

First, FIG. 4 is a flowchart schematically illustrating an example of a process (a locking and unlocking function starting process) of starting a locking and unlocking function in the processor 23 of the mobile terminal 20. The process in this flowchart is performed at predetermined time intervals, for example, after an authentication key is acquired and until an end time of a reservation for the vehicle 10.

In Step S402, the communication processing unit 231 searches for the key unit 12 corresponding to the reserved vehicle 10 from a communication area of the communication device 21 around the mobile terminal 20 based on the BLE access information (a device ID, a service UUID, and the like) which has been acquired from the center server and stored in the storage unit 239, where the BLE access information is included in the authentication key information.

In Step S404, the communication processing unit 231 determines whether the key unit 12 (the communication device 123) corresponding to the reserved vehicle 10 has been detected. The communication processing unit 231 performs Step S406 when the key unit 12 corresponding to the reserved vehicle 10 has been detected, and ends this process otherwise.

In Step S406, the communication processing unit 231 transmits an access request including the identification information of the mobile terminal 20 (for example, a terminal ID or a device ID of the communication device 21).

In Step S408, the communication processing unit 231 determines whether an access response has been received from the key unit 12. The communication processing unit 231 performs Step S410 when the access response has been received from the key unit 12 within a predetermined time (for example, a time which is sufficiently longer than a maximum time assumed as a communication time from the mobile terminal 20 to the key unit 12) after transmission of the access request, and ends this process when an access response has not been received from the key unit 12 within the predetermined time after transmission of the access request.

In Step S410, the authentication requesting unit 234 determines whether an authentication key request has been received from the key unit 12 by the communication processing unit 231. The authentication requesting unit 234 performs Step S412 when an authentication key request has been received from the key unit 12 by the communication processing unit 231 within a predetermined time after reception of the access response by the communication processing unit 231, and performs Step S414 otherwise.

In Step S412, the authentication requesting unit 234 transmits an authentication request including an authentication key (see Step S326 in FIG. 3) encrypted by the center server 40 and stored in the storage unit 239 and an issuance ID of the authentication key to the key unit 12 via the communication processing unit 231, and then performs Step S420.

On the other hand, in Step S414, the authentication requesting unit 234 determines whether a challenge for re-authentication of the mobile terminal 20 has been received from the key unit 12 by the communication processing unit 231. The authentication requesting unit 234 performs Step S416 when a challenge has been received from the key unit 12 by the communication processing unit 231 within a predetermined time after reception of an access response by the communication processing unit 231, and ends this process otherwise.

In Step S416, the authentication requesting unit 234 generates a response based on the challenge received by the communication processing unit 231. Specifically, the authentication requesting unit 234 encrypts the challenge using a communication encryption key received by the communication processing unit 231 at the time of previous authentication or re-authentication.

In Step S418, the authentication requesting unit 234 transmits a re-authentication request including the generated response to the key unit 12, and then performs Step S420.

In Step S420, the authentication requesting unit 234 determines whether a communication encryption key has been received from the key unit 12 by the communication processing unit 231. The authentication requesting unit 234 performs Step S422 when a communication encryption key has been received from the key unit 12 by the communication processing unit 231 within a predetermined time after transmission of the authentication request or the re-authentication request by the communication processing unit 231, and ends this process otherwise.

In Step S422, the authentication requesting unit 234 decrypts the communication encryption key received by the communication processing unit 231 using a reception-side decryption key (see Steps S324 and S326 in FIG. 3) stored in the storage unit 239.

In Step S424, the authentication requesting unit 234 determines whether decryption of the communication encryption key received by the communication processing unit 231 has succeeded. The authentication requesting unit 234 performs Step S426 when decryption of the received communication encryption key has succeeded, and ends this process otherwise. Accordingly, for example, even when a communication encryption key encrypted using a transmission-side encryption key 1250c and transmitted from the key unit 12 to the mobile terminal 20 has been wiretapped by a malicious third party, the communication encryption key cannot be decrypted without using the reception-side decryption key acquired by the mobile terminal 20 along with the authentication key from the center server 40, and thus it is possible to prevent unauthorized use of the vehicle 10 due to wiretapping of the communication encryption key.

The decrypted communication encryption key is stored in the storage unit 239.

In Step S426, the authentication requesting unit 234 transmits a locking and unlocking function ON request which has been encrypted using the communication encryption key to the key unit 12 via the communication processing unit 231, and ends this process.

Figure 5:
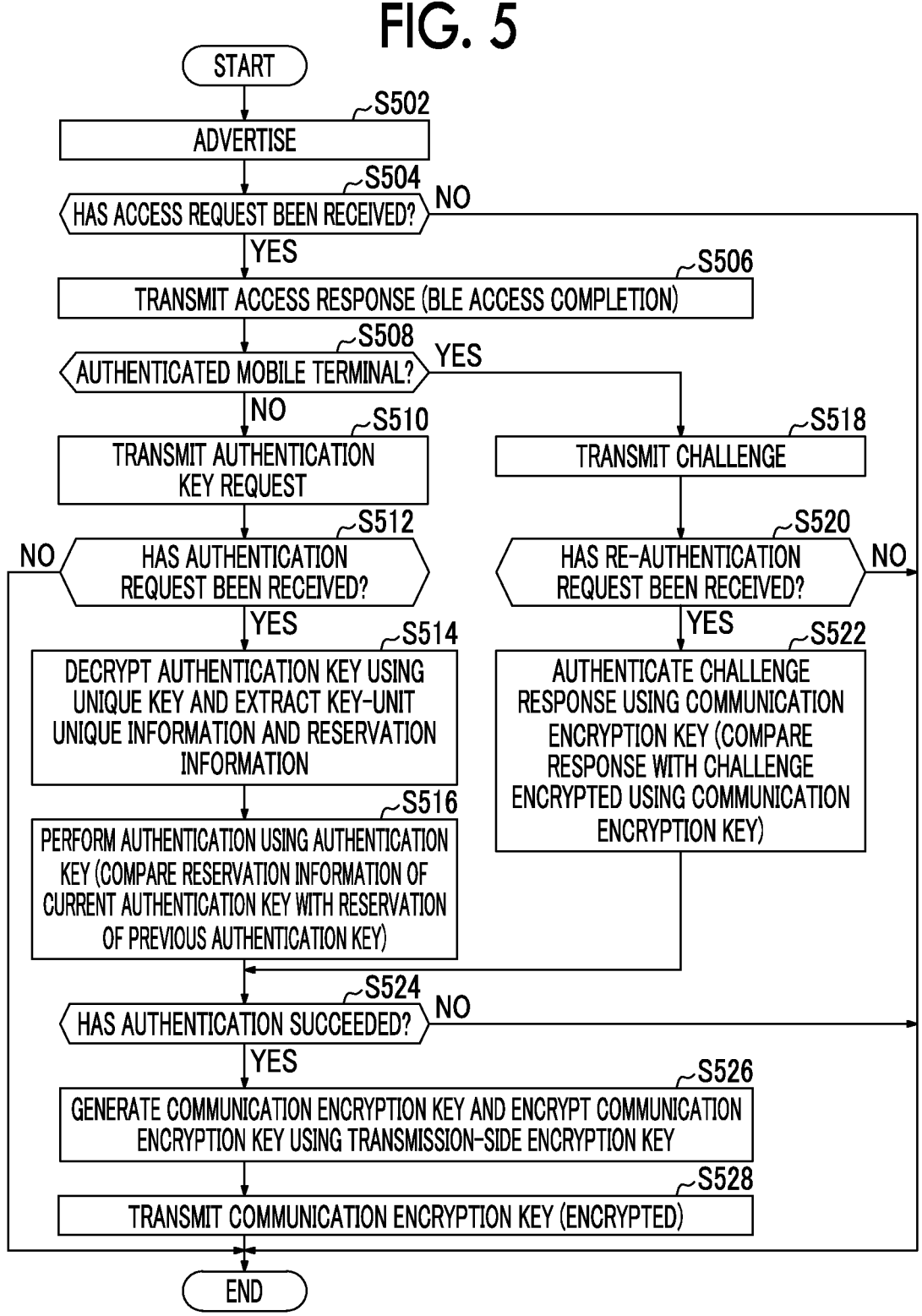
FIG. 5 is a flowchart illustrating schematically illustrating an example of a mobile terminal authenticating process which is performed by a key ECU of the key unit according to the aspect of the disclosure.

FIG. 5 is a flowchart schematically illustrating an example of a process of authenticating the mobile terminal 20 which is performed by the key ECU 124 of the key unit 12. The process in this flowchart is repeatedly performed, for example, in a state in which there is no mobile terminal 20 connected to the key unit 12 in a communicable manner.

In Step S502, the communication processing unit 1243 controls the communication device 123 and transmits advertisement information (for example, a service UUID or a device ID) to the vicinity of the vehicle 10 (specifically, within a reachable distance of BLE communication radio waves from the communication device 123).

In Step S504, the communication processing unit 1243 determines whether an access request has been received from the mobile terminal 20. The communication processing unit 1243 performs Step S506 when an access request has been received from the mobile terminal 20, and ends this process otherwise.

In Step S506, the communication processing unit 1243 sets up a session of BLE access to the mobile terminal 20 and transmits an access response indicating completion of BLE access to the mobile terminal 20.

In Step S508, the authentication processing unit 1245 determines whether the mobile terminal 20 of which the session of BLE access has been set up by the communication processing unit 1243 has been already authenticated using an authentication key based on the identification information of the mobile terminal 20 included in the access request. The authentication processing unit 1245 performs Step S510 when the mobile terminal 20 has not been authenticated, and performs Step S518 when the mobile terminal has been authenticated.

In Step S510, the authentication processing unit 1245 transmits an authentication key request to the mobile terminal 20 via the communication processing unit 1243.

In Step S512, the authentication processing unit 1245 determines whether an authentication request including an authentication key has been received from the mobile terminal 20 by the communication processing unit 1243. The authentication processing unit 1245 performs Step S514 when an authentication request has been received from the mobile terminal 20 by the communication processing unit 1243 within a predetermined time after an authentication key request has been transmitted from the communication processing unit 1243, and ends this process otherwise.

In Step S514, the authentication processing unit 1245 decrypts the authentication key encrypted by the center server 40 and included in the authentication request using a unique key 1250a, and extracts key-unit unique information and reservation information (a start time and an end time of a reservation for the vehicle 10) included in the authentication key.

In Step S516, the authentication processing unit 1245 authenticates the mobile terminal 20 based on the extracted key-unit unique information and the extracted reservation information. For example, the authentication processing unit 1245 authenticates the mobile terminal 20 based on whether the extracted key-unit unique information matches the key-unit unique information stored in advance in the storage unit 1250 of the key unit 12, whether the extracted reservation information (the start time and the end time) of the current authentication key overlaps the reservation information (a start time and an end time) of an authentication key used for previous authentication, and the like. Accordingly, the authentication processing unit 1245 performs verification of whether the reservation information overlaps in addition to verification based on the key-unit unique information unique to the key unit 12, and can enable no terminal to reuse an authentication key used once for authentication regardless of whether it is the mobile terminal 20 which should be authenticated using the authentication key or another terminal. Accordingly, for example, when an authentication key is wiretapped by a malicious third party at the time of transmitting an authentication request including the authentication key from the mobile terminal 20 to the key unit 12, the authentication cannot be reused and it is thus possible to prevent unauthorized use of the vehicle 10 by the malicious third party.

On the other hand, in Step S518, the authentication processing unit 1245 generates a challenge based on a prescribed calculation equation or the like and transmits the challenge to the mobile terminal 20 via the communication processing unit 1243.

In Step S520, the authentication processing unit 1245 determines whether a re-authentication request including a response has been received from the mobile terminal 20 by the communication processing unit 1243. The authentication processing unit 1245 performs Step S522 when the re-authentication request has been received from the mobile terminal 20 by the communication processing unit 1243 within a predetermined time after transmission of the challenge from the communication processing unit 1243, and ends this process otherwise.

In Step S522, the authentication processing unit 1245 authenticates a challenge response using a communication encryption key which has been used in a previous session of BLE communication between the authenticated mobile terminal 20 and the key unit 12. Specifically, the authentication processing unit 1245 performs re-authentication of the mobile terminal 20 depending on whether the challenge which has been encrypted using the previous communication encryption key matches the response received from the mobile terminal 20 by the communication processing unit 1243.

In Step S524, the authentication processing unit 1245 determines whether authentication in Step S516 or S522 has succeeded. The authentication processing unit 1245 performs Step S526 when the authentication has succeeded, and ends this process when the authentication has failed.

In Step S526, the encryption key generating unit 1248 generates a communication encryption key and performs encryption using the transmission-side encryption key 1250*c*.

In Step S528, the authentication processing unit 1245 transmits the communication encryption key generated by the encryption key generating unit 1248 to the mobile terminal 20 via the communication processing unit 1243 and ends this process. Accordingly, the communication encryption key which is used for encryption when a locking request or an unlocking request is transmitted from the mobile terminal 20 to the key unit 12 is updated when a communication failure state between the mobile terminal 20 and the key unit 12 transitions to a communication success state. Accordingly, for example, even when a communication encryption key leaks due to identity theft or the like, the key unit 12 cannot be accessed using the communication encryption key and thus it is possible to prevent unauthorized use of the vehicle 10 by a malicious third party.

Figure 6:
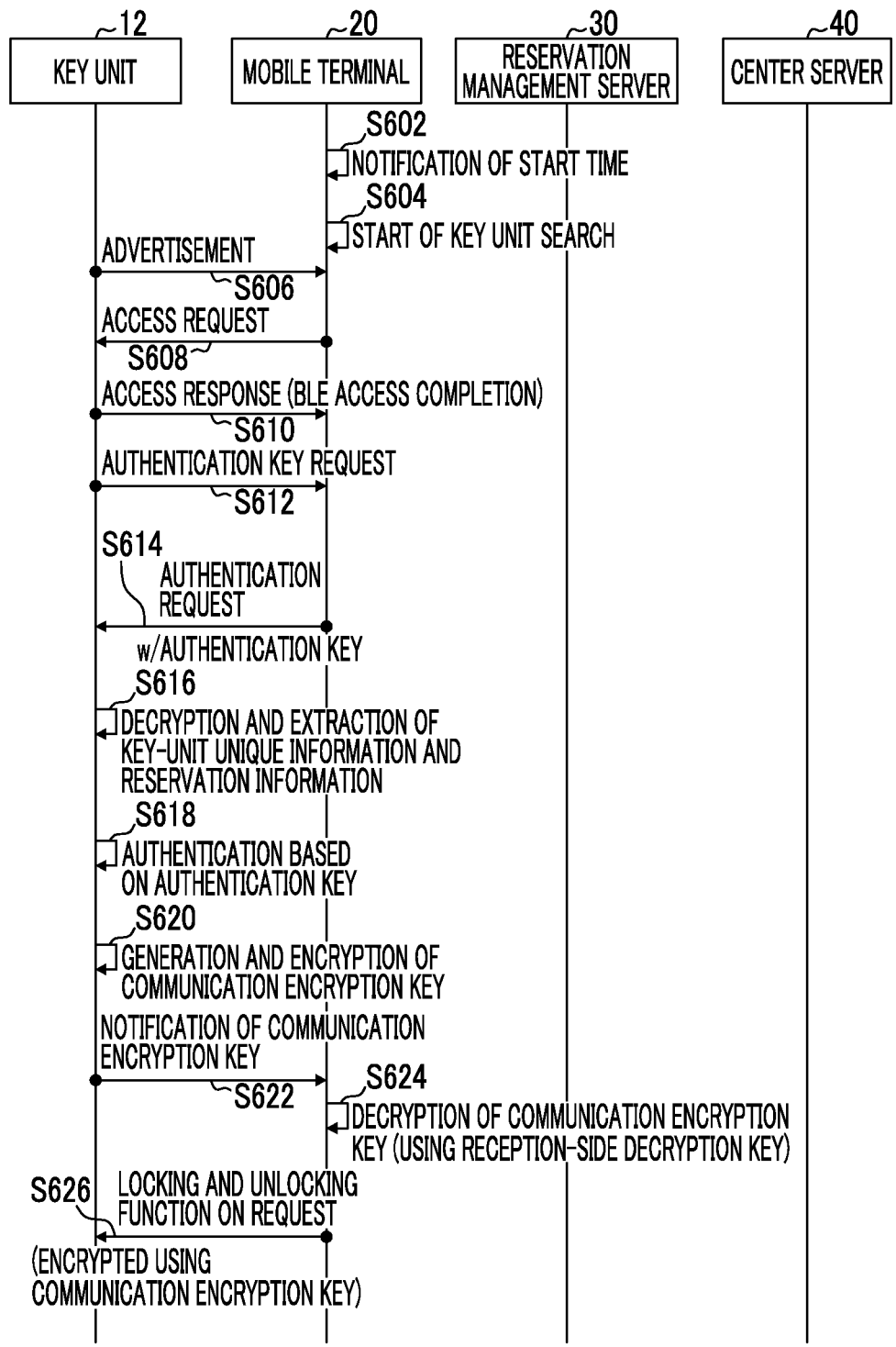
FIG. 6 is a sequence diagram schematically illustrating an example of operations of the locking and unlocking system corresponding to the locking and unlocking function starting process which is performed by the mobile terminal and the mobile terminal authenticating process which is performed by the key unit according to the aspect of the disclosure.

FIG. 6 is a sequence diagram schematically illustrating an example of operations of the locking and unlocking system 1 corresponding to a locking and unlocking function starting process which is performed by the mobile terminal 20 and an authentication process of the mobile terminal 20 which is performed by the key unit 12.

In this example, description is based on the premise that a user carrying the mobile terminal 20 arrives at the vicinity of the vehicle 10 at a start time of a reservation for the vehicle 10.

In Step S602, the communication processing unit 231 of the mobile terminal 20 detects the start time of the reservation for the vehicle 10.

In Step S604, the communication processing unit 231 of the mobile terminal 20 searches for the key unit 12 corresponding to the reserved vehicle 10 based on BLE access information stored in the storage unit 239 (Step S402 in FIG. 4).

On the other hand, in Step S606, the communication processing unit 1243 of the key unit 12 transmits advertisement information to a predetermined communication area in the vicinity of the key unit 12 (that is, the vicinity of the vehicle 10) via the communication device 123 (Step S502 in FIG. 5).

In Step S608, the communication processing unit 231 of the mobile terminal 20 detects the key unit 12 by receiving advertisement information from the key unit 12, and transmits an access request to the key unit 12 in response to a transmission request from the authentication requesting unit 234 (YES in Step S404 and Step S406 in FIG. 4).

In Step S610, the communication processing unit 1243 of the key unit 12 sets up a BLE communication session with the mobile terminal 20 in response to the access request received from the mobile terminal 20 and transmits an access response to the mobile terminal 20 (YES in Step S504 and Step S506 in FIG. 5).

In Step S612, when the mobile terminal 20 with which the BLE communication session has been set up is not authenticated, the authentication processing unit 1245 of the key unit 12 transmits an authentication key request to the mobile terminal 20 via the communication processing unit 1243 (NO in Step S508 and Step S510 in FIG. 5).

In S614, the authentication requesting unit 234 of the mobile terminal 20 transmits an authentication request including an authentication key encrypted by the center server 40 or an issuance ID of the authentication key to the key unit 12 via the communication processing unit 231 in response to the authentication key request received by the communication processing unit 231 (YES in Step S410 and Step S412 in FIG. 4).

In Step S616, the authentication processing unit 1245 of the key unit 12 decrypts the encrypted authentication key included in the authentication key request received from the mobile terminal 20 by the communication processing unit 1243 using a unique key 1250*a*, and extracts key-unit unique information or reservation information for the vehicle 10 included in the authentication key (Step S514 in FIG. 5).

In Step S618, the authentication processing unit 1245 of the key unit 12 performs authentication of the mobile terminal 20 based on the authentication key, that is, authentication of the mobile terminal 20 based on the key-unit unique information or the reservation information which is extracted from the authentication key (Step S516 in FIG. 5).

In Step S620, when the authentication of the mobile terminal 20 has succeeded, the encryption key generating unit 1248 of the key unit 12 generates a communication encryption key and encrypts the communication encryption key using the transmission-side encryption key 1250*c* (Step S526 in FIG. 5).

In Step S622, the authentication processing unit 1245 of the key unit 12 transmits the communication encryption key generated by the encryption key generating unit 1248 to the mobile terminal 20 (Step S528 in FIG. 5).

In Step S624, the authentication requesting unit 234 of the mobile terminal 20 decrypts the communication encryption key received by the communication processing unit 231 using a reception-side decryption key stored in the storage unit 239 (Step S422 in FIG. 4).

In Step S626, when the communication encryption key has been successfully decrypted, the authentication requesting unit 234 transmits a locking and unlocking function ON notification which is encrypted using the communication encryption key to the key unit 12 via the communication processing unit 231.

As described hitherto, authentication of the mobile terminal 20 is completed through Steps S602 to S626.

Operations associated with unlocking of a door of the vehicle 10 using the mobile terminal 20 in the locking and unlocking system 1 will be described below with reference to FIGS. 7 to 10.

Figure 7:
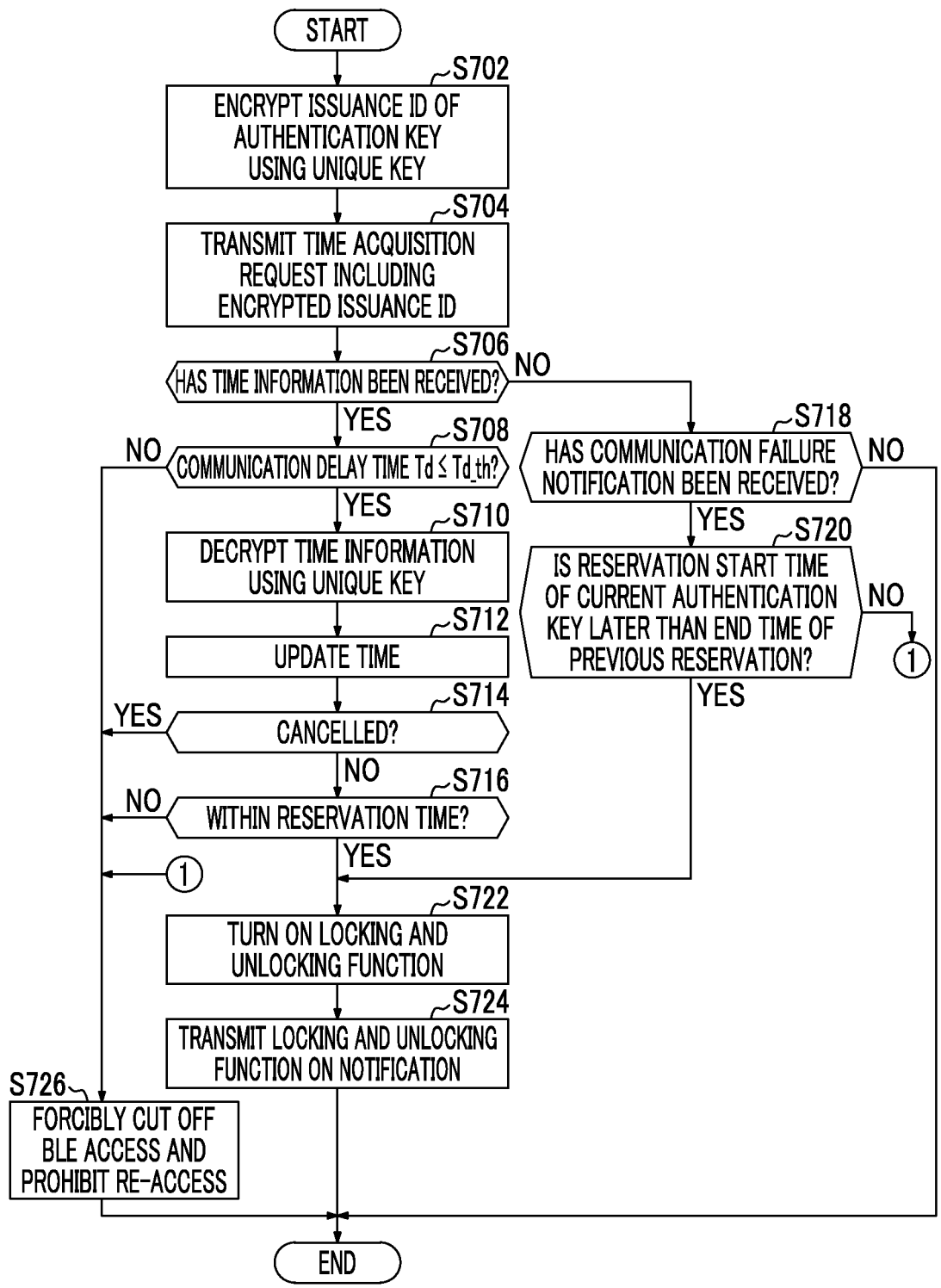
FIG. 7 is a flowchart illustrating schematically illustrating an example of a time updating process which is performed by the key ECU of the key unit according to the aspect of the disclosure.

FIG. 7 is a flowchart schematically illustrating an example of a time updating process which is performed by the key ECU 124 of the key unit 12. The process in this flowchart is performed, for example, when authentication or re-authentication of the mobile terminal 20 has succeeded and a locking and unlocking function ON request has been received from the mobile terminal 20 by the communication processing unit 1243. A process in which Steps S722 and S724 which will be described later have been removed from the flowchart is periodically (for example, every 30 minutes) performed in a situation in which a state in which a BLE communication access session between the key unit 12 and the mobile terminal 20 has been set up is maintained after the authentication or re-authentication of the mobile terminal 20 has succeeded.

In Step S702, the time update processing unit 1246 encrypts an issuance ID of an authentication key which is used for authentication of the authenticated mobile terminal 20 using the unique key 1250a.

In Step S704, the time update processing unit 1246 transmits a time acquisition request including the encrypted issuance ID to the center server 40 via the communication processing unit 1243 and the mobile terminal 20.

In Step S706, the time update processing unit 1246 determines whether time information has been received from the center server 40 via the mobile terminal 20 by the communication processing unit 1243. The time update processing unit 1246 performs Step S708 when time information has been received by the communication processing unit 1243 within a predetermined time after transmission of a time acquisition request from the communication processing unit 1243, and performs Step S718 otherwise.

In Step S708, the time update processing unit 1246 determines whether an elapsed time (a communication delay time Td) from transmission of the time acquisition request from the communication processing unit 1243 to reception of the time information is equal to or less than a predetermined threshold value Td_th. The predetermined threshold value Td_th is set in advance as a time in which it can be determined whether there is an intentional communication delay in the mobile terminal 20 which relays the time information from the center server 40. When the communication delay time Td is equal to or less than the predetermined threshold value Td_th, the time update processing unit 1246 determines that there is no intentional communication delay in the mobile terminal 20 or the like, and performs Step S710. When the communication delay time Td is not equal to or less than the predetermined threshold value Td_th, the time update processing unit 1246 determines that there is an intentional communication delay in the mobile terminal 20 or the like, and performs Step S726.

In Step S710, the time update processing unit 1246 decrypts the time information received by the communication processing unit 1243 using the unique key 1250a.

In Step S712, the time update processing unit 1246 synchronizes the time of the clocking unit 1244 with the time of the center server 40 by updating the time of the clocking unit 1244 to the time of the center server 40 (the RTC 42) included in the decrypted time information.

In Step S714, the determination unit 1247 determines whether the reservation for the vehicle 10 corresponding to the authentication key used for authentication of the authenticated mobile terminal 20 by the authentication processing unit 1245 can been cancelled based on the cancel flag F included in the decrypted time information. The determination unit 1247 determines that the reservation for the vehicle 10 corresponding to the authentication key used for authentication of the authenticated mobile terminal 20 has been cancelled when the cancel flag F included in the decrypted time information is "1," and determines that the reservation for the vehicle 10 has not been cancelled when the cancel flag F is "0." The determination unit 1247 performs Step S716 when the reservation for the vehicle 10 corresponding to the authentication key used for authentication of the authenticated mobile terminal 20 by the authentication processing unit 1245 has not been cancelled, and performs Step S726 when the reservation has been cancelled.

In Step S716, the determination unit 1247 determines whether a current time is within a reservation time for the vehicle 10. Specifically, the determination unit 1247 determines whether the updated time of the clocking unit 1244 is included between the start time and the end time of the reservation extracted from the authentication key at the time of authentication of the mobile terminal 20 by the authentication processing unit 1245. The determination unit 1247 performs Step S722 when it is determined that the current time is within the reservation time for the vehicle 10, and performs Step S726 when it is determined that the current time is not within the reservation time.

On the other hand, in Step S718, the time update processing unit 1246 determines whether a communication failure notification has been received from the mobile terminal 20 by the communication processing unit 1243. The communication failure notification is transmitted from the mobile terminal 20 to the key unit 12, and is a notification indicating that transmission and reception of a signal of the mobile terminal 20 to and from the reservation management server 30 and the center server 40 is not possible due to reasons why the mobile terminal 20 is out of a mobile phone network or a communication function via the mobile phone network is turned off. When the communication failure notification has been received from the mobile terminal 20 by the communication processing unit 1243 within a predetermined time after transmission of a time acquisition request from the communication processing unit 1243, the time update processing unit 1246 cannot acquire time information from the center server 40, thus does not update the time of the clocking unit 1244, and performs Step S720. Otherwise, this process ends.

In Step S720, the determination unit 1247 determines whether the current time is within the reservation time for the vehicle 10. Here, since communication between the mobile terminal 20 and the reservation management server 30 is not possible and the time of clocking unit 1244 is not synchronized with the time of the center server 40, simple determination is performed. Specifically, the determination unit 1247 determines that the current time is within the reservation time for the vehicle 10 when the start time of the reservation for the vehicle 10 corresponding to the current authentication key used for authentication of the currently authenticated mobile terminal 20 is later than the end time of the reservation for the vehicle 10 corresponding to the authentication key used for authentication of the previously authenticated mobile terminal 20 based on a history of the reservation information (the start time and the end time of the reservation) for the vehicle 10 included in the history of the authentication key used for authentication of the mobile terminal 20 stored in the storage unit 1250, and determines that the current time is not within the reservation time for the vehicle 10 otherwise. The determination unit 1247 performs Step S722 when it is determined that the current time is within the reservation time for the vehicle 10, and performs Step S726 when it is determined that the current time is not within the reservation time for the vehicle 10.

In Step S722, the locking and unlocking processing unit 1249 turns on the locking and unlocking function.

When the locking and unlocking function of the key unit 12 is turned off, the functions of the communication processing unit 1243, the clocking unit 1244, the authentication processing unit 1245, the time update processing unit 1246, the determination unit 1247, the encryption key generating unit 1248, the locking and unlocking processing unit 1249, and the like having very small power consumption are usable. When the locking and unlocking function of the key unit 12 is switched to the OFF state to the ON state, for example, the LF wave receiver 121, the RF wave transmitter 122, and the like having large power consumption are usable.

In Step S724, the authentication processing unit 1245 transmits the locking and unlocking function ON notification indicating that the locking and unlocking function is turned on to the mobile terminal 20 via the communication processing unit 1243, and ends this process.

On the other hand, in Step S726, the locking and unlocking processing unit 1249 forcibly cuts off the communication session of BLE communication between the key unit 12 and the mobile terminal 20 set up by the communication processing unit 1243 and prohibits subsequent re-access of the mobile terminal 20. That is, unlocking of the vehicle 10 by the mobile terminal 20 is prohibited. Accordingly, when it is determined through the process of Step S708 that there is an intentional communication delay in the mobile terminal 20 in the course of transmitting time information from the center server 40 to the key unit 12, the communication between the mobile terminal 20 and the key unit 12 is cut off and re-access is prohibited. Accordingly, for example, even when a malicious third party intentionally manipulates the time of the key unit 12 using the mobile terminal 20 and intends unauthorized use outside of the reservation time, it is possible to prevent the unauthorized use. When it is determined through the process of Step S714 that the reservation for the vehicle 10 corresponding to the authentication key used for authentication of the authenticated mobile terminal 20 has been cancelled, the communication between the mobile terminal 20 and the key unit 12 is cut off and re-access is prohibited. Accordingly, for example, even when the mobile terminal 20 in which a previously acquired authentication key is stored is handed over to a malicious third party, an authorized user of the mobile terminal 20 can cancel the reservation for the vehicle 10 using another terminal, a phone call, or the like to prohibit use of the vehicle 10 by the malicious third party and to prevent unauthorized use of the vehicle 10. When it is determined through the process of Step S716 that the current time is not within the reservation time for the vehicle 10, the communication between the mobile terminal 20 and the key unit 12 is cut off and re-access is prohibited. Accordingly, for example, the vehicle 10 cannot be used before the start time of the reservation for the vehicle 10 using the previously acquired authentication key and thus it is possible to prevent unauthorized use of the vehicle 10. When it is determined through the process of Step S720 that the current time is not within the reservation time for the vehicle 10, the communication between the mobile terminal 20 and the key unit 12 is cut off and re-access is prohibited. Accordingly, for example, even when the time of the clocking unit 1244 cannot be updated due to a reason why the mobile terminal 20 is out of the mobile phone network or the like, it is possible to prevent use of the vehicle 10 before an end time of a reservation which is at least immediately previous.

Figure 8:
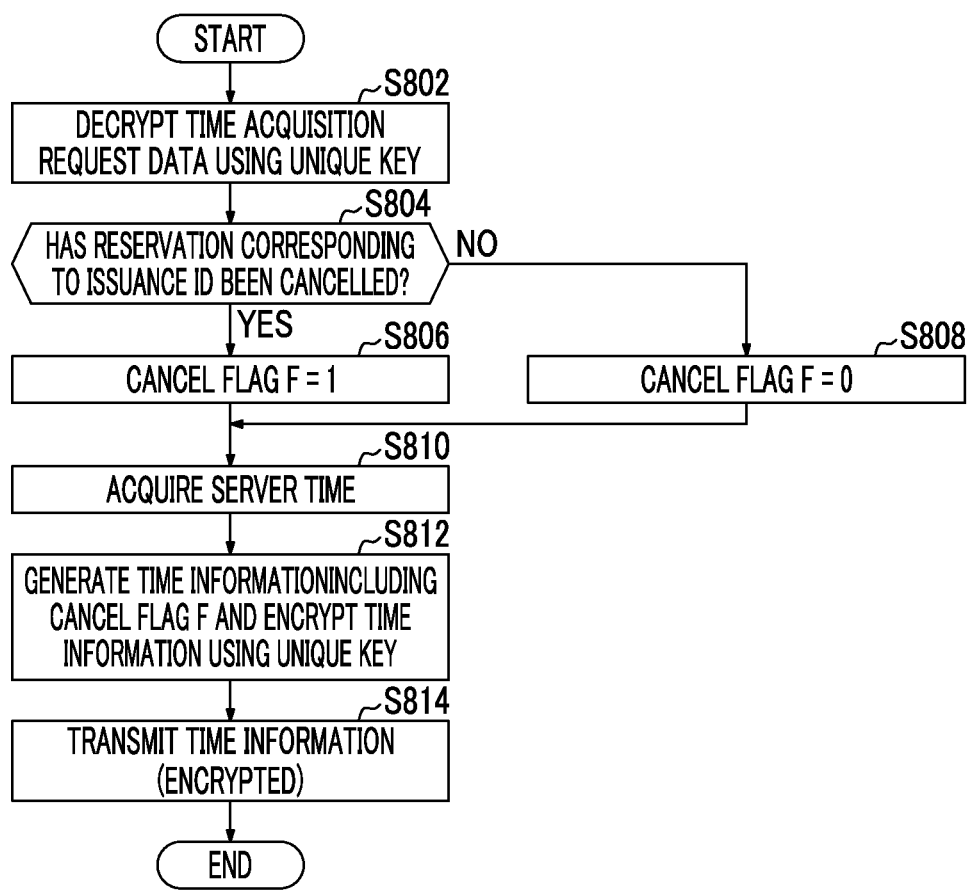
FIG. 8 is a flowchart schematically illustrating an example of a time updating process which is performed by a management device of a center server according to the aspect of the disclosure.

FIG. 8 is a flowchart schematically illustrating an example of a time updating process which is performed by the management device 43 of the center server 40. The process in the flowchart is performed, for example, when a time acquisition request has been received from the key unit 12 via the reservation management server 30 by the communication processing unit 431.

In Step S802, the time synchronization processing unit 433 decrypts data of the time acquisition request which is received by the communication processing unit 431 using a unique key corresponding to the key unit 12 as a transmission source which is stored in the unique key DB 435.

In Step S804, the time synchronization processing unit 433 determines whether a reservation for the vehicle 10 corresponding to the issuance ID of the authentication key included in the decrypted time acquisition request has been cancelled with reference to the cancel information DB 438. The time synchronization processing unit 433 performs Step S806 when the reservation for the vehicle 10 corresponding to the issuance ID of the authentication key included in the time acquisition request has been cancelled, and performs Step S808 when the reservation has not been cancelled.

In Step S806, the time synchronization processing unit 433 sets the cancel flag F to "1" which indicates that the reservation for the vehicle 10 has been cancelled, and then performs Step S810.

On the other hand, in Step S808, the time synchronization processing unit 433 sets the cancel flag F to "0" which indicates that the reservation for the vehicle 10 has not been cancelled, and then performs Step S810.

In Step S810, the time synchronization processing unit 433 acquires the time of the center server 40, that is, the time of the RTC 42.

In Step S812, the time synchronization processing unit 433 generates time information including the acquired time of the center server 40 and the cancel flag F and encrypts the time information using a unique key corresponding to the key unit 12 as a transmission source of the time acquisition request, which is stored in the unique key DB 435.

In Step S814, the time synchronization processing unit 433 transmits the encrypted time information to the key unit 12 via the communication processing unit 431, the reservation management server 30, and the mobile terminal 20, and ends this process. Accordingly, whenever a time acquisition request is transmitted from the key unit 12 to the center server 40 via the mobile terminal 20 and the reservation management server 30 in a state in which communication between the mobile terminal 20 and the key unit 12 is possible, the cancel flag F along with the time is transmitted from the center server 40 and thus the key unit 12 side can grasp whether the reservation for the vehicle 10 has been cancelled.

Figure 9:
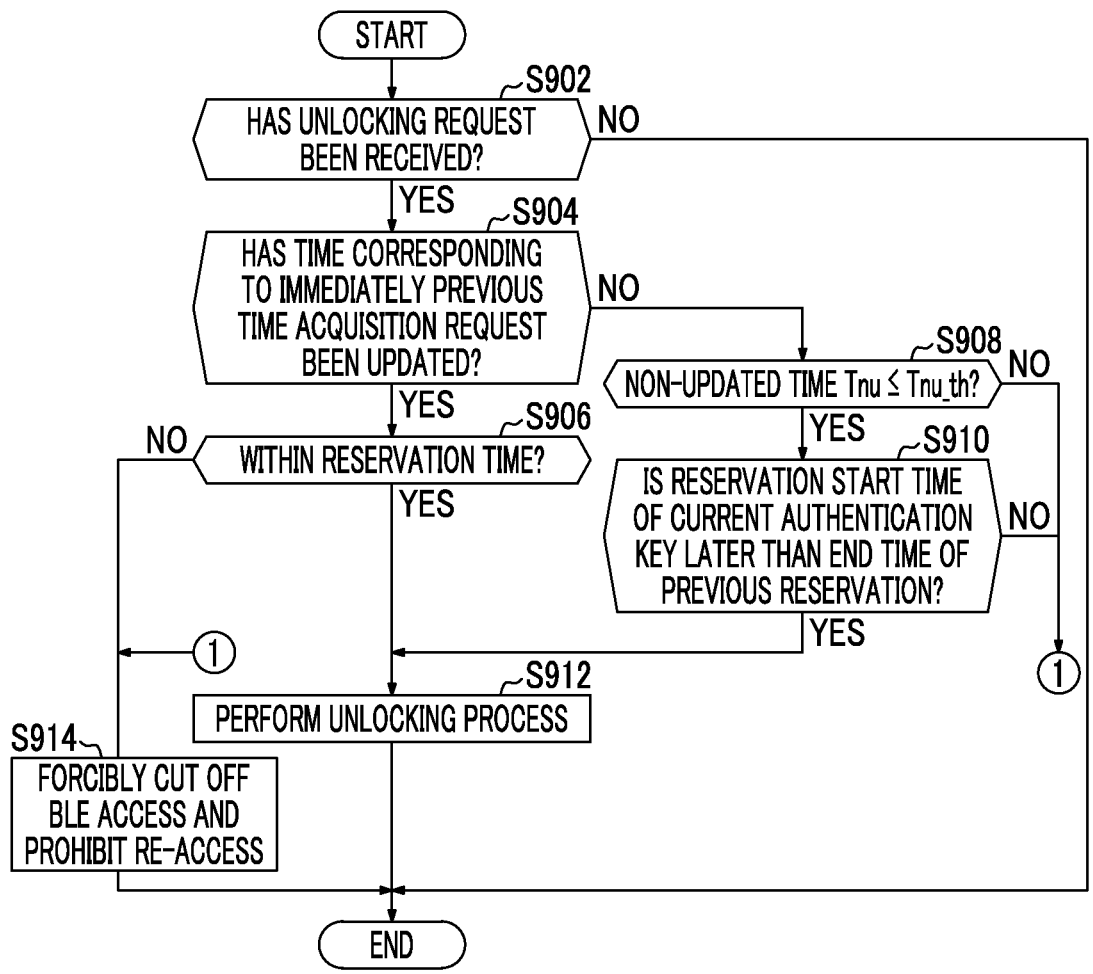
FIG. 9 is a flowchart illustrating schematically illustrating an example of an unlocking process which is performed by the key ECU of the key unit according to the aspect of the disclosure.

FIG. 9 is a flowchart schematically illustrating an example of an unlocking process which is performed by the key ECU 124 of the key unit 12. The process in the flowchart is repeatedly performed at predetermined time intervals, for example, in a state in which the locking and unlocking function is turned on.

In Step S902, the locking and unlocking processing unit 1249 determines whether an unlocking request which was encrypted using the communication encryption key has been received from the mobile terminal 20 by the communication processing unit 1243. The locking and unlocking processing unit 1249 performs Step S904 when the unlocking request encrypted using the communication encryption key has been received from the mobile terminal 20 by the communication processing unit 1243, and ends this process otherwise.

In Step S904, the locking and unlocking processing unit 1249 determines whether the time of the clocking unit 1244 has been updated in response to the latest time acquisition request. The process transitions to Step S906 when the time of the clocking unit 1244 has been updated in response to the latest time acquisition request, and the process transitions to Step S908 when the time of the clocking unit 1244 has not been updated in response to the latest time acquisition request.

In Step S906, the determination unit 1247 determines whether the current time is within the reservation time for the vehicle 10 corresponding to the authentication key used for authentication of the mobile terminal 20. Specifically, the determination unit 1247 determines whether the time of the clocking unit 1244 is included between the start time and the end time of the reservation information included in the authentication key. The determination unit 1247 performs Step S912 when the current time is within the reservation time for the vehicle 10 corresponding to the authentication key used for authentication of the mobile terminal 20, and performs Step S914 when the current time is not within the reservation time.

On the other hand, in Step S908, the locking and unlocking processing unit 1249 determines whether a time (a non-updated time) Tnu in which the time of the clocking unit 1244 is not updated is equal to or less than a predetermined threshold value Tnu_th. The locking and unlocking processing unit 1249 performs Step S910 when the non-updated time Tnu of the clocking unit 1244 is equal to or less than the predetermined threshold value Tnu_th, and performs Step S914 when the non-updated time Tnu of the clocking unit 1244 is not equal to or less than the predetermined threshold value Tnu_th.

In Step S910, the determination unit 1247 determines whether the current time is within the reservation time for the vehicle 10. Here, since communication between the mobile terminal 20 and the reservation management server 30 is not possible and the time of the clocking unit 1244 is not synchronized with the time of the center server 40, simple determination is performed. Specifically, based on a history of the reservation information for the vehicle 10 (the start time and the end time of the reservation) included in the history of the authentication key used for authentication of the mobile terminal 20 which is stored in the storage unit 1250, the determination unit 1247 determines that the current time is within the reservation time for the vehicle 10 when the start time of the reservation for the vehicle 10 corresponding to the current authentication key used for authentication of the currently authenticated mobile terminal 20 is later than the end time of the reservation for the vehicle 10 corresponding to the authentication key used for authentication of the previously authenticated mobile terminal 20, and determines that the current time is not within the reservation time for the vehicle 10 otherwise. The determination unit 1347 performs Step S912 when it is determined that the current time is within the reservation time for the vehicle 10, and performs Step S914 when it is determined that the current time is not within the reservation time for the vehicle 10.

In Step S912, the locking and unlocking processing unit 1249 performs a process of unlocking the door of the vehicle 10, that is, transmits an unlocking signal to the locking and unlocking device 11 via the RF transmission processing unit 1242 and unlocks the door of the vehicle 10.

On the other hand, in Step S914, the communication processing unit 1243 forcibly cuts off a communication session of BLE communication between the key unit 12 and the mobile terminal 20, and prohibits subsequent re-access of the mobile terminal 20. That is, unlocking of the vehicle 10 using the mobile terminal 20 is prohibited. Accordingly, the same operations and advantages as the process of Step S726 in FIG. 7 are obtained. That is, for example, the vehicle 10 cannot be used before the start time of the reservation for the vehicle 10 using the authentication key which has been acquired in advance, and it is possible to prevent unauthorized use of the vehicle 10. For example, even when the time of the clocking unit 1244 cannot be updated due to a reason why the mobile terminal 20 is out of the mobile phone network or the like, it is possible to prevent the vehicle 10 from being used at least before the end time of a reservation immediately previous to the reservation. In addition, in this example, when the non-updated time Tnu of the key unit 12 (the clocking unit 1244) is greater than the predetermined threshold value Tnu_th by the process of Step S908, communication between the mobile terminal 20 and the key unit 12 is cut off and re-access is prohibited. Accordingly, for example, even when a user intentionally turns off the communication function of the communication processing unit 232 of the mobile terminal 20 and continues to use the vehicle 10 in a state in which the time of the key unit 12 is not synchronized with the time of the center server 40, it is possible to prevent unauthorized use of the vehicle 10 by setting the predetermined threshold value Tnu_th as a limit time for the non-updated time Tnu.

When a locking signal has been received from the mobile terminal 20 by the communication processing unit 1243, the locking and unlocking processing unit 1249 may be configured to skip the processes of Step S904 to S910 and S914 in FIG. 9 and to perform a process of locking the door of the vehicle 10, that is, to transmit a locking signal to the locking and unlocking device 11 via the RF transmission processing unit 1242. Since the locking of the vehicle 10 refers to a situation in which a user gets off the vehicle 10 and goes away from the vehicle 10, the locking is thought to be preferably permitted even when unauthorized use of the vehicle 10 is suspected. The same process as illustrated in FIG. 9 may be performed when a locking signal has been received from the mobile terminal 20 by the communication processing unit 1243.

FIG. 10 is a sequence diagram schematically illustrating an example of operations associated with a time synchronizing process which is performed by the key unit 12 and the center server 40 in the locking and unlocking system 1 and an unlocking process which is performed by the key unit 12.

The following description is based on the premise that the operations of the locking and unlocking system 1 in the sequence diagram illustrated in FIG. 10 are performed subsequently to the operations in the sequence diagram illustrated in FIG. 6.

In Step S1002, the time update processing unit 1246 of the key unit 12 encrypts the issuance ID of the authentication key used for authentication of the authenticated mobile terminal 20 (Step S802 in FIG. 7).

In Step S1004, the time update processing unit 1246 of the key unit 12 transmits a time acquisition request including the encrypted issuance ID to the mobile terminal 20 via the communication processing unit 1243 (Step S704 in FIG. 7).

In Step S1006, when the time acquisition request with the center server 40 as a destination is received from the key unit 12, the communication processing unit 231 of the mobile terminal 20 sends the received time acquisition request to the communication processing unit 232, and the communication processing unit 232 transmits the time acquisition request to the reservation management server 30.

In Step S1008, when the time acquisition request with the center server 40 as a destination is received from the mobile terminal 20, the communication processing unit 321 of the reservation management server 30 transmits the received time acquisition request to the center server 40.

In Step S1010, the time synchronization processing unit 433 of the center server 40 decrypts data of the time acquisition request received by the communication processing unit 431 (Step S802 in FIG. 8).

In Step S1012, the time synchronization processing unit 433 of the center server 40 compares cancel information in the cancel information DB 438 with the issuance ID of the authentication key included in the time acquisition request and sets the cancel flag F (Steps S804 to S808 in FIG. 8).

In Step S1014, the time synchronization processing unit 433 of the center server 40 acquires the time of the center server 40 (the RTC 42) (Step S810 in FIG. 8).

In Step S1015, the time synchronization processing unit 433 generates time information including the time of the center server 40 and the cancel flag F, and encrypts the generated time information using a unique key (Step S812 in FIG. 8).

In Step S1016, the time synchronization processing unit 433 transmits the encrypted time information to the reservation management server 30 via the communication processing unit 431 (Step S814 in FIG. 8).

In Step S1018, when the time information to the key unit 12 is received from the center server 40, the communication processing unit 321 of the reservation management server 30 transmits the time information to the mobile terminal 20.

In Step S1020, when the time information to the key unit 12 is received from the reservation management server 30, the communication processing unit 232 of the mobile terminal 20 sends the time information to the communication processing unit 231, and the communication processing unit 231 transmits the time information to the key unit 12.

In Step S1021, when the time information is received by the communication processing unit 1243, the time update processing unit 1246 of the key unit 12 confirms a limit requirement for the communication delay time Td (whether the communication delay time Td is equal to or less than the predetermined threshold value Td_th) (Step S708 in FIG. 7).

When the communication delay time Td is equal to or less than the predetermined threshold value Td_th (YES in Step S708 in FIG. 7), the time update processing unit 1246 decrypts the time information using the unique key 1250a in Step S1022 (Step S710 in FIG. 7).

In Step S1024, the time update processing unit 1246 of the key unit 12 updates the time of the clocking unit 1244 to the time of the center server 40 (the RTC 42) included in the decrypted time information (Step S712 in FIG. 7).

In Step S1026, the determination unit 1247 of the key unit 12 confirms the cancel flag F included in the decrypted time information and determines whether the reservation for the vehicle 10 corresponding to the authenticated mobile terminal 20 has been cancelled (Step S714 in FIG. 7).

When the reservation for the vehicle 10 to the authenticated mobile terminal 20 has not been cancelled (NO in Step S714 in FIG. 7), the determination unit 1247 of the key unit 12 confirms the reservation information (the start time and the end time of the reservation for the vehicle 10) included in the authentication key corresponding to the authenticated mobile terminal 20 and determines whether the current time is within the reservation time for the vehicle 10 in Step S1028 (Step S716 in FIG. 7).

When the current time is within the reservation time for the vehicle 10 (YE in Step S716 in FIG. 7), the locking and unlocking processing unit 1249 turns on the locking and unlocking function in Step S1030 (Step S722 in FIG. 7).

In Step S1032, the locking and unlocking processing unit 1249 transmits the locking and unlocking function ON notification to the mobile terminal 20 via the communication processing unit 1243 (Step S724 in FIG. 7).

In Step S1034, the locking and unlocking requesting unit 235 of the mobile terminal 20 receives a user's predetermined operation (unlocking operation) on the GUI of the display 24.

In Step S1036, the locking and unlocking requesting unit 235 of the mobile terminal 20 transmits an unlocking request which has been encrypted using the communication encryption key stored in the storage unit 239 to the key unit 12 via the communication processing unit 231 in response to the unlocking operation.

In Step S1038, when the unlocking request is received by the communication processing unit 1243 (YES in S902 in FIG. 9), newest time updates has been performed (YES in S904 in FIG. 9) and thus the determination unit 1247 of the key unit 12 confirms the reservation information (the start time and the end time of the reservation for the vehicle 10) included in the authentication key corresponding to the authenticated mobile terminal 20 and determines whether the current time is within the reservation time for the vehicle 10 (Step S906 in FIG. 9)

When the current time is within the reservation time for the vehicle 10 (YES in Step S906 in FIG. 9), the locking and unlocking processing unit 1249 of the key unit 12 performs the process of unlocking the door of the vehicle 10 and unlocks the door of the vehicle 10 in Step S1040.

As described above, a series of operations of updating the time of the key unit 12 (synchronization with the time of the center server 40), starting the locking and unlocking function resulting from confirmation of various limit requirements, and unlocking the door of the vehicle 10 based on the unlocking operation is completed through Steps of S1002 to S1040.

In this way, in this embodiment, the center server 40 includes the communication processing unit 431 that transmits a cancel flag F (cancel information) indicating whether the reservation for the vehicle 10 has been cancelled to the key unit 12.

The mobile terminal 20 includes the communication processing unit 231 that transmits an authentication key (first authentication information) correlated with the reservation for the vehicle 10 to the key unit 12 and transmits the unlocking request or the locking request (both of which are the first request signal) for requesting unlocking or locking of the door of the vehicle 10 to the key unit 12. The key unit 12 includes the communication processing unit 1243 that receives the cancel flag F from the center server 40, receives the authentication key from the mobile terminal 20, and receives the unlocking request and the locking request from the mobile terminal 20, the authentication processing unit 1245 that authenticates the mobile terminal 20 based on the authentication key when the authentication key has been received by the communication processing unit 1243, and the locking and unlocking processing unit 1249 that performs a process of unlocking or locking the door of the vehicle 10 when the authentication of the mobile terminal 20 by the authentication processing unit 1245 has succeeded and the unlocking request or the locking request has been received by the communication processing unit 1243. When the authentication of the mobile terminal 20 by the authentication processing unit 1245 has succeeded and the cancel flag F received by the communication processing unit 1243 indicates that the reservation for the vehicle 10 corresponding to the authentication key used for the authentication of the mobile terminal 20 by the authentication processing unit 1245 has been cancelled, the locking and unlocking processing unit 1249 prohibits unlocking of the door of the vehicle 10 based on the unlocking request transmitted from the mobile terminal 20. Accordingly, even when a malicious third party has gotten the mobile terminal 20 in which the authentication key (the first authentication information) was acquired and stored in advance, it is possible to prohibit unlocking of the vehicle 10 using the mobile terminal 20, for example, by causing the user of the mobile terminal 20 to cancel the reservation for the vehicle 10 using any method.

Accordingly, it is possible to prevent a malicious third party from improperly using the vehicle 10.

In this embodiment, the key unit 12 includes the communication processing unit 1243 that transmits the second request signal (the time acquisition request) including a request for the cancel flag F corresponding to the authentication key used for the authentication of the mobile terminal 20 by the authentication processing unit 1245 to the center server 40 via the mobile terminal 20 and the reservation management server 30 when the authentication of the mobile terminal 20 by the authentication processing unit 1245 has succeeded. The center server 40 includes the communication processing unit 431 that receives the second request signal (the time acquisition request) transmitted from the key unit 12. When the second request signal (the time acquisition request) has been received by itself, the communication processing unit 431 transmits a response signal (time information) including the cancel flag F to the key unit 12 via the reservation management server 30 and the mobile terminal 20. Accordingly, even when a malicious third party having gotten the mobile terminal 20 in which the authentication key acquired in advance was stored has succeeded in authenticating the mobile terminal 20, the second request signal is immediately transmitted from the key unit 12 to the center server 40 with the success of authentication as a trigger, and unlocking of the vehicle 10 using the mobile terminal 20 can be prohibited based on the cancel flag F transmitted from the center server 40 in response to the second request signal. Accordingly, it is possible to prevent a malicious third party from improperly using the vehicle 10.

In this embodiment, the key unit 12 includes the clocking unit 1244 that performs clocking. The center server 40 includes the RTC 42 that performs clocking with higher accuracy than the clocking unit 1244 of the key unit 12. The communication processing unit 231 and the communication processing unit 232 (the relay unit) of the mobile terminal 20 perform a relay function of receiving a signal transmitted from one of the center server 40 and the key unit 12 to the other and transmitting (sending) the signal to the other. The communication processing unit 1243 of the key unit 12 transmits the time acquisition request to the center server 40 including the request for the cancel flag F and the request for the time of the RTC 42 to the mobile terminal 20, the relay unit of the mobile terminal 20 receives the time acquisition request from the key unit 12 and transmits the time acquisition request to the center server 40 via the reservation management server 30, and the communication processing unit 431 of the center server 40 receives the time acquisition request from the mobile terminal 20. When the time acquisition request has been received, the communication processing unit 431 of the center server 40 transmits the time information to the key unit 12 including the cancel flag F and the time of the RTC 42 to the mobile terminal 20 via the reservation management server 30, the relay unit of the mobile terminal 20 receives the time information from the center server 40 and transmits the time information to the key unit 12, and the communication processing unit 1243 of the key unit 12 receives the time information from the mobile terminal 20. The clocking unit 1244 of the key unit 12 is synchronized with the RTC 42 based on the time of the RTC 42 included in the time information received by the communication processing unit 1243. Accordingly, the key unit 12 needs to perform synchronization of the time of the clocking unit 1244 with relatively low accuracy in a state in which communication with the mobile terminal 20 is possible. In this case, it is possible to achieve improvement in efficiency of communication between the center server 40, the mobile terminal 20, and the key unit 12 by employing a configuration in which the second request signal (the time acquisition request) including the acquisition request for the cancel flag F transmitted to the center server 40 and the acquisition request for the time of the center server 40 (the RTC 42) with the success of authentication of the mobile terminal 20, which is performed in the state in which communication with the mobile terminal 20 is possible, as a trigger and both the cancel flag F and the time of the center server 40 are simultaneously acquired from the center server 40.

The cancel flag F may be transmitted from the center server 40 to the key unit 12 using a signal other than the signal used to transmit the time information.

In this embodiment, the locking and unlocking system 1 includes the locking and unlocking device 11 which is mounted in the vehicle 10. The key unit 12 includes the storage unit 1250 that stores the locking and unlocking key information 1250*b* correlated with the vehicle 10. The locking and unlocking device 11 includes the RF reception processing unit 1132 that receives an unlocking signal and a locking signal (a third request signal) including the locking and unlocking key information 1250*b* from the key unit 12, an authentication processing unit 1133 that performs authentication of the key unit based on the locking and unlocking key information included in the unlocking signal and the locking signal when the unlocking signal and the locking signal are received by the RF reception processing unit 1132, and the locking and unlocking control unit 1134 that unlocks or locks the door of the vehicle 10 when the authentication by the authentication processing unit 1133. The locking and unlocking processing unit 1249 of the key unit 12 transmits the unlocking signal or the locking signal including the locking and unlocking key information 1250*b* to the locking and unlocking device 11 via the RF transmission processing unit 1242 as a process of unlocking or locking the door of the vehicle 10. Accordingly, the key unit 12 can unlock and lock the vehicle 10 by transmitting the unlocking signal and the locking signal to the locking and unlocking device 11 which is mounted in the vehicle 10. Accordingly, for example, the locking and unlocking system 1 can be configured by additionally providing the key unit 12 in the locking and unlocking device 11 mounted already in the vehicle 10.

In this embodiment, the key unit 12 (the locking and unlocking processing unit 1249) is configured to unlock and lock the door of the vehicle 10 via the comparison ECU 113 of the locking and unlocking device 11 but, for example, a configuration in which the key unit 12 directly transmits a control command to the body ECU 114 to operate the door lock motor 115 may be employed.

In this embodiment, the mobile terminal 20 (the authentication key acquiring unit 233) acquires the authentication key from the center server 40, but the disclosure is not limited to the configuration. For example, the authentication key may be acquired from a specific terminal which is disposed in a predetermined stored associated with a shared car or a rented car in a wired or wireless manner.

While embodiments of the disclosure have been described above in detail, the disclosure is not limited to the specific embodiments, and can be modified and changed in various forms without departing from the gist of the disclosure.

For example, in the embodiments, an object of locking and unlocking and reservation is a vehicle, but is not limited to a vehicle as long as it can be shared and used in time by a plurality of users and can be locked and unlocked. That is, a vehicle which is an object of locking and unlocking and reservation in the embodiment may be replaced, for example, with a lockable and unlockable facility such as a conference room, a resort house, or a gymnasium. Accordingly, as in the above-mentioned embodiment, it is possible to improve convenience to a user who uses the facility and to prevent improper intrusion into the facility.

What is claimed is:

1. A server configured to communicate with a key unit configured to unlock or lock a door of a vehicle or facility in response to a first request signal for requesting unlocking or locking of the vehicle or facility which is transmitted from a mobile terminal, the key unit being disposed in the vehicle or facility, and to store information on a reservation for the vehicle or facility, the server comprising:
    a server transmission unit configured to transmit cancel information indicating whether the reservation for the vehicle or facility has been cancelled to the key unit,
    wherein the key unit is configured to control to unlock of the door of the vehicle or facility based on the cancel information after authenticating the mobile terminal.

2. The server according to claim 1, wherein the cancel information is a cancel flag included in encrypted time information.

3. A method for unlocking or locking a door of a vehicle or facility using a key unit configured to unlock or lock a door of a vehicle or facility in response to a first request signal for requesting unlocking or locking of the vehicle or facility which is transmitted from a mobile terminal, the key unit being disposed in the vehicle or facility, the method comprising:
    storing information on a reservation for the vehicle or facility on a server;
    transmitting, to the key unit, cancel information indicating whether the reservation for the vehicle or facility has been cancelled; and
    controlling, using the key unit, unlock of the door of the vehicle or facility based on the cancel information after authenticating the mobile terminal.

4. The method according to claim 3, wherein the cancel information is a cancel flag included in encrypted time information.

* * * * *